United States Patent
Murase et al.

(10) Patent No.: US 6,285,826 B1
(45) Date of Patent: Sep. 4, 2001

(54) OPTICAL DISC RECORDING DEVICE AND REPRODUCING DEVICE

(75) Inventors: Kaoru Murase, Ikoma-gun; Tomoyuki Okada, Katano; Kazuhiro Tsuga; Noriko Sugimoto, both of Takarazuka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/541,883

(22) Filed: Mar. 31, 2000

(30) Foreign Application Priority Data

Apr. 2, 1999 (JP) .................................. 11-096499

(51) Int. Cl.⁷ .............................. H04N 5/781; H04N 5/83
(52) U.S. Cl. ........................................... 386/125; 386/124
(58) Field of Search ..................... 386/125, 126, 386/109, 111, 112, 105, 106, 46, 52, 124, 55, 1, 4, 45, 40, 120, 95; 360/32; H04N 5/781, 5/83

(56) References Cited

U.S. PATENT DOCUMENTS

| | | |
|---|---|---|
| 5,568,461 | 10/1996 | Nishiuchi et al. . |
| 6,118,927 | * 9/2000 | Kikuchi et al. ............... 386/95 |
| 6,167,189 | * 12/2000 | Taira et al. ................... 386/95 |
| 6,181,871 | * 1/2001 | Saeki et al. .................. 386/95 |
| 6,185,365 | * 2/2001 | Maruse et al. ................ 386/95 |

FOREIGN PATENT DOCUMENTS

| | | |
|---|---|---|
| 0737980 | 10/1996 | (EP) . |
| 0903738 | 3/1999 | (EP) . |
| 0903744 | 3/1999 | (EP) . |
| 0971535 | 1/2000 | (EP) . |
| 0994480 | 4/2000 | (EP) . |
| 07093873 | 4/1995 | (JP) . |
| 08007282 | 1/1996 | (JP) . |
| 9-259542 | 10/1997 | (JP) . |
| 9-261584 | 10/1997 | (JP) . |
| 9-270992 | 10/1997 | (JP) . |
| 10-51739 | 2/1998 | (JP) . |
| 10-125046 | 5/1998 | (JP) . |
| 11-238367 | 8/1999 | (JP) . |
| 12-4421 | 1/2000 | (JP) . |
| 12-83217 | 3/2000 | (JP) . |
| 00/02195 | 1/2000 | (WO) . |
| 00/14744 | 3/2000 | (WO) . |

* cited by examiner

*Primary Examiner*—Robert Chevalier
(74) *Attorney, Agent, or Firm*—Wenderoth, Lind & Ponack, L.L.P.

(57) ABSTRACT

Output obtained during playback, and operations available during playback, differ according to the content of the reproduction path being played from an optical disc storing plural reproduction paths containing plural different types of audio and/or image information. Content type information indicative of the specific audio and/or video content of each reproduction path is stored for each reproduction path on the optical disc. This information is then presented to the user on a reproduction path (program or play list) selection screen to inform the user and assist in the play list selection process. Operation of the disc player or disc editor can be changed appropriately to this content type information.

5 Claims, 45 Drawing Sheets

*Fig.7*

| VERN | | | | | | | |
|---|---|---|---|---|---|---|---|
| b15 | b14 | b13 | b12 | b11 | b10 | b9 | b8 |
| b7 | b6 | b5 | b4 | b3 | b2 | b1 | b0 |
| | | | reserved | | | | |
| | | | Book version | | | | |

| TM_ZONE | | | | | | | |
|---|---|---|---|---|---|---|---|
| b15 | b14 | b13 | b12 | b11 | b10 | b9 | b8 |
| b7 | b6 | b5 | b4 | b3 | b2 | b1 | b0 |
| | | TZ_TY | | | TZ_OFFSET[11..8] | | |
| | | | TZ_OFFSET[7..0] | | | | |

Fig. 9

| PL_TY | | | | | | | |
|---|---|---|---|---|---|---|---|
| b7 | b6 | b5 | b4 | b3 | b2 | b1 | b0 |
| PL_TY1 | | | | | reserved | | |

| PL_CREATE_TM | | | | | | | |
|---|---|---|---|---|---|---|---|
| b39 | b38 | b37 | b36 | b35 | b34 | b33 | b32 |
| b31 | b30 | b29 | b28 | b27 | b26 | b25 | b24 |
| b23 | b22 | b21 | b20 | b19 | b18 | b17 | b16 |
| b15 | b14 | b13 | b12 | b11 | b10 | b9 | b8 |
| b7 | b6 | b5 | b4 | b3 | b2 | b1 | b0 |

Year[13..6]
Year[5..0]   Month[3..2]
Month[1..0]   Day[4..0]   Hour[4]
Hour[3..0]   Minute[5..2]
Minute[1..0]   Second[5..0]

*Fig.10*

| PTM describing format | | | | | | |
|---|---|---|---|---|---|---|
| b47 | b46 | b45 | b44 | b43 | b42 | b41 | b40 |
| | | | PTM_base[31..24] | | | |
| b39 | b38 | b37 | b36 | b35 | b34 | b33 | b32 |
| | | | PTM_base[23..16] | | | |
| b31 | b30 | b29 | b28 | b27 | b26 | b25 | b24 |
| | | | PTM_base[15..8] | | | |
| b23 | b22 | b21 | b20 | b19 | b18 | b17 | b16 |
| | | | PTM_base[7..0] | | | |
| b15 | b14 | b13 | b12 | b11 | b10 | b9 | b8 |
| | | | PTM_extension[15..8] | | | |
| b7 | b6 | b5 | b4 | b3 | b2 | b1 | b0 |
| | | | PTM_extension[7..0] | | | |

Fig.11

| S_VOB_ENTN describing format | | | | | | | |
|---|---|---|---|---|---|---|---|
| b47 | b46 | b45 | b44 | b43 | b42 | b41 | b40 |
| S_VOB_ENTN | | | | | | | |
| b39 | b38 | b37 | b36 | b35 | b34 | b33 | b32 |
| b31 | b30 | b29 | b28 | b27 | b26 | b25 | b24 |
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| reserved | | | | | | | |

Fig.13

| V_ATR | | | | | | | | |
|---|---|---|---|---|---|---|---|---|
| | b15 | b14 | b13 | b12 | b11 | b10 | b9 | b8 |
| | Video compression | | TV system | | Aspect ratio | | Application Flag | |
| | b7 | b6 | b5 | b4 | b3 | b2 | b1 | b0 |
| | line21_switch_1 | line21_switch_2 | Video resolution | | | | reserved | |

| A_ATR0 | | | | | | | | |
|---|---|---|---|---|---|---|---|---|
| | b23 | b22 | b21 | b20 | b19 | b18 | b17 | b16 |
| | Audio coding mode | | | reserved | Preference Flag | | Application Flag | |
| | b15 | b14 | b13 | b12 | b11 | b10 | b9 | b8 |
| | Quantization/DRC | | fs | | | Number of Audio channels | | |
| | b7 | b6 | b5 | b4 | b3 | b2 | b1 | b0 |
| | Bitrate | | | | | | | |

Fig. 14

SP_ATR

| b15 | b14 | b13 | b12 | b11 | b10 | b9 | b8 |
|---|---|---|---|---|---|---|---|
| | | | reserved | | | | |
| b7 | b6 | b5 | b4 | b3 | b2 | b1 | b0 |
| | | | reserved | | | | Application Flag |

SP_PLT

| b23 | b22 | b21 | b20 | b19 | b18 | b17 | b16 |
|---|---|---|---|---|---|---|---|
| | | | Luminance signal(Y) | | | | |
| b15 | b14 | b13 | b12 | b11 | b10 | b9 | b8 |
| | | | Color difference signal(Cr=R−Y) | | | | |
| b7 | b6 | b5 | b4 | b3 | b2 | b1 | b0 |
| | | | Color difference signal(Cb=B−Y) | | | | |

| VOB. TY | | | | | | | |
|---|---|---|---|---|---|---|---|
| b15 | b14 | b13 | b12 | b11 | b10 | b9 | b8 |
| TE | A0_STATUS | | | A1_STATUS | | APS | |
| b7 | b6 | b5 | b4 | b3 | b2 | b1 | b0 |
| SML_FLG | A0_GAP_LOC | | | A1_GAP_LOC | reserved | | |

Fig.19

| VOBU_ENT | | | | | | |
|---|---|---|---|---|---|---|
| b23 | b22 | b21 | b20 | b19 | b18 | b17 | b16 |
| b15 | b14 | b13 | b12 | b11 | b10 | b9 | b8 |
| b7 | b6 | b5 | b4 | b3 | b2 | b1 | b0 |
| | | | 1STREF_SZ | | | |
| | | VOBU_PB_TM | | | VOBU_SZ(upper) | |
| | | | VOBU_SZ(lower) | | | |

Fig.21

| V_ATR | | | | | | | | |
|---|---|---|---|---|---|---|---|---|
| b15 | b14 | b13 | b12 | b11 | b10 | b9 | b8 | |
| Video compression mode | | TV system | | Aspect ratio | | reserved | | |
| b7 | b6 | b5 | b4 | b3 | b2 | b1 | b0 | |
| reserved | | Video resolution | | | reserved | | | |

| OA_ATR | | | | | | | | |
|---|---|---|---|---|---|---|---|---|
| b15 | b14 | b13 | b12 | b11 | b10 | b9 | b8 | |
| Audio coding mode | | | reserved | | | Application Flag | | |
| b7 | b6 | b5 | b4 | b3 | b2 | b1 | b0 | |
| Quan./DRC | | fs | | | Number of Audio channels | | | |

Fig.22

SP_ATR

| b15 | b14 | b13 | b12 | b11 | b10 | b9 | b8 |
|---|---|---|---|---|---|---|---|
| | | | reserved | | | | |
| b7 | b6 | b5 | b4 | b3 | b2 | b1 | b0 |
| | | | reserved | | | Application Flag | |

SP_PLT

| b23 | b22 | b21 | b20 | b19 | b18 | b17 | b16 |
|---|---|---|---|---|---|---|---|
| | | | Luminance signal(Y) | | | | |
| b15 | b14 | b13 | b12 | b11 | b10 | b9 | b8 |
| | | | Color difference signal(Cr=R−Y) | | | | |
| b7 | b6 | b5 | b4 | b3 | b2 | b1 | b0 |
| | | | Color difference signal(Cb=B−Y) | | | | |

Fig.24

| S_VOB ENT (TYPE A) | 2bytes |
|---|---|
| S_VOB ENT_TY | 1byte |
| V_PART_SZ | 1byte |

| S_VOB ENT (TYPE B) | 6bytes |
|---|---|
| S_VOB ENT_TY | 1byte |
| V_PART_SZ | 1byte |
| A_PART_SZ | 2bytes |
| A_PB_TM | 2bytes |

Fig.25

| S_VOB_ENT_TY | | | | | | | |
|---|---|---|---|---|---|---|---|
| b7 | b6 | b5 | b4 | b3 | b2 | b1 | b0 |
| MAP_TY | | TE | reserved | | | | SPST_Ns |

Fig.29

| PG_TY | | | | | | | |
|---|---|---|---|---|---|---|---|
| b7 | b6 | b5 | b4 | b3 | b2 | b1 | b0 |
| Protect | reserved | | | | | | |

Fig.31

| C_TY | | b7 | b6 | b5 | b4 | b3 | b2 | b1 | b0 |
|------|---|----|----|----|----|----|----|----|----|
| | | | C_TY1 | reserved | | | | | |

Fig.32

| M_C_EPI (Type A) | 7bytes |
|---|---|
| EP_TY | 1byte |
| EP_PTM | 6bytes |

| M_C_EPI (Type B) | 135bytes |
|---|---|
| EP_TY | 1byte |
| EP_PTM | 6bytes |
| PRM_TXTI | 128bytes |

| S_C_EPI (Type A) | 7bytes |
|---|---|
| EP_TY | 1byte |
| S_VOB_ENTN | 6bytes |

| S_C_EPI (Type B) | 135bytes |
|---|---|
| EP_TY | 1byte |
| S_VOB_ENTN | 1byte |
| PRM_TXTI | 128bytes |

Fig.33

| EP_TY1 | b7 | b6 | b5 | b4 | b3 | b2 | b1 | b0 |
|--------|----|----|----|----|----|----|----|----|
| EP_TY1 | reserved ||||||||

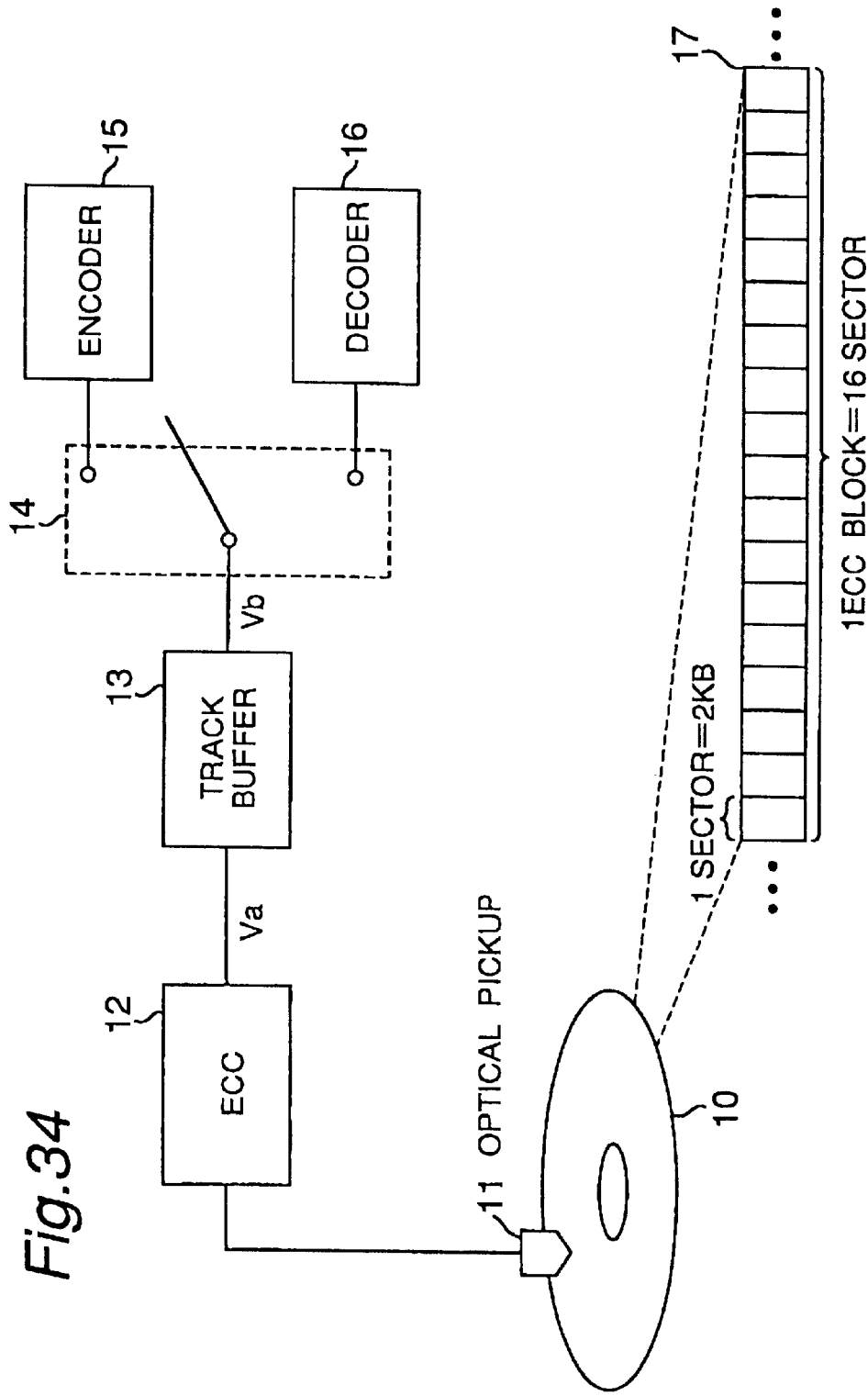

Fig.39A VIDEO
Fig.39B VIDEO BUFFER
Fig.39C MPEG STREAM
Fig.39D AUDIO

OPTICAL DISC RECORDING DEVICE AND REPRODUCING DEVICE

BACKGROUND OF THE INVENTION

1. Field of the Invention

The present invention relates to a readable and writable optical disc, and to a recording device and a reproducing device for the optical disk. More particularly, the present invention relates to an optical disc for recording multimedia data including moving picture data, still picture data, and audio data, and to a recording device and a reproducing device for this optical disc.

2. Description of the Related Art

Rewritable optical discs have for years had a maximum storage capacity of approximately 650 MB, but this has been changed by the development of phase change type DVD-RAM discs with a capacity of several gigabytes. Combined with the adoption of MPEG, and particularly MPEG-2, standards for encoding digital AV data, DVD-RAM is widely anticipated as a recording and reproducing medium with application in the AV industry as well as the computer industry. More specifically, DVD-RAM media are expected to replace magnetic tape as the storage medium of choice for AV recordings.

DVD-RAM

Increases in the storage density of rewritable optical disc media over the last few years has made it possible to use such media for applications ranging from storing computer data and recording audio data to recording image data, including movies.

The signal recording surface of a conventional optical disc is typically formatted with lands and grooves, one of which is used as a guide groove for signal recording and reproducing. The data signal is then recorded using only the land or the groove. With the advent of the land and groove recording method, however, it became possible to record signals to both the land and groove. This development approximately doubled the storage capacity of the disc. (See, for example, Japanese Unexamined Patent Application (kokai) 8-7282.)

Further development of a zone CLV (constant linear velocity) method simplified and made it easy to implement a CLV recording and reproducing technique, an effective means of further increasing the recording density. (See, for example, Japanese Unexamined Patent Application (kokai) 7-93873.)

A major topic left for future development is how to use such potentially high capacity optical disc media to record AV data containing image data to achieve new functions and performance far surpassing conventional AV products.

With the introduction of high capacity rewritable optical disc media, optical discs are widely expected to replace conventional tape media for recording and reproducing AV content. The transition from tape to disc recording media is also expected to greatly affect both the performance and functions of AV recording and reproducing products.

One of the greatest benefits of a transition to disc is a significant improvement in random access performance. While random access to tape content is possible, it generally takes on the order of minutes to rewind a full tape. This is several orders slower than the typical seek time of optical disc media, which is on the order of at most several ten milliseconds. Tape is therefore considered, for practical purposes, not to be a random access medium.

The random access capability of optical disc media has also made possible distributed, that is, noncontiguous, recording of AV data, which is not possible with conventional tape.

FIG. 34 is a block diagram of the drive device of a DVD recorder. As shown in FIG. 34, this DVD recorder comprises an optical pickup 11 for reading data from the disc 10, an ECC (error correction code) processor 12, track buffer 13, switch 14 for changing track buffer input/output, encoder 15, and decoder 16. An enlarged view of the disc 17 format is also shown.

As indicated by the disc 17 format, the smallest unit used for recording data to a DVD-RAM disc is the sector, which is 2 KB. Sixteen sectors are combined as one ECC block, to which the ECC processor 12 applies error correction coding.

The track buffer 13 is used for recording AV data at a variable bit rate in order to record AV data to a DVD-RAM disc more efficiently. While the read/write rate (Va) to a DVD-RAM disc is fixed, the bit rate (Vb) of the AV data is variable, based on the complexity of the AV data content (e.g., images if the AV data is video). The track buffer 13 is used to absorb this bit rate difference. This means that the track buffer 13 is unnecessary if the AV data bit rate is also fixed, as it is in the Video CD format.

This track buffer 13 can be even more effectively used by dispersed placement of the AV data on the disc. This is explained with reference to FIG. 35.

FIG. 35(a) shows the disc address space. If the AV data is recorded divided between contiguous area A1 between addresses a1 and a2, and contiguous area A2 between a3 and a4 as shown in FIG. 35(a), the AV data can be continuously reproduced from these non-contiguous areas A1 and A2 by supplying data accumulated in the track buffer 13 to the decoder while the optical head seeks from a2 to a3. This is shown in FIG. 35(b).

Once reading AV data starts from a1 at time t1, it is both input to the track buffer 13 and output from the track buffer 13 with data accumulating in the track buffer at the rate (Va−Vb), that is, the difference between the input rate Va to the track buffer and the output rate Vb from the track buffer. This continues to address a2 at time t2. Assuming that the data volume accumulated to the track buffer at this time is B(t2), data supply to the decoder can continue until the data B(t2) accumulated to the track buffer is depleted at time t3 at which reading resumes from address a3.

In other words, if it is assured that a certain volume of data (a1, a2) is read before a seek operation is performed, AV data can be continuously supplied to the decoder while the seek is in progress.

It should be noted that this example considers reading, that is, reproducing, data from DVD-RAM, but the same concept applies for writing or recording data to DVD-RAM.

It will thus be obvious that insofar as a specified amount of data is recorded continuously to DVD-RAM disc, continuous reproduction and recording is possible even if the AV data is noncontiguously recorded to the disc.

MPEG

A common AV data format is described next below.

As noted above, AV data is recorded to DVD-RAM media using the MPEG international standard, also known as ISO/IEC 13818.

Even though DVD-RAM discs have a large, plural gigabyte, capacity, this is still not sufficient for recording uncompressed digital AV data of any duration. A way to compress and record AV data is therefore necessary. This need was addressed by worldwide adoption of the MPEG (ISO/IEC 13818) standard for AV data compression. MPEG decoders (compression/decompression ICs) have also been realized with advances in IC devices. This has enabled the DVD recorder to handle MPEG compression and decompression internally.

MPEG signal processing is able to achieve high efficiency data compression chiefly as a result of the following two features.

First is that compression using a time correlation characteristic between frames (known as pictures in MPEG) is used in conjunction with conventional compression using a spatial frequency characteristic for moving picture data compression. Each video sequence of an MPEG video signal stream is divided into one or more groups of pictures, each group of pictures comprising one or more pictures of three different types: I-pictures (intraframe coded pictures), P-pictures (predictive-coded pictures, that is, intracoded with reference to a preceding picture), and B-pictures (bidirectionally predictive-coded pictures, that is, intraframe coded with reference to preceding and following pictures).

FIG. 36 shows the relationship between I, P, and B pictures. As shown in FIG. 36, P-pictures refer to temporally preceding I- or P-pictures in the sequence, while B-pictures refer to the first preceding and following I- or P-pictures. It should also be noted that because B-pictures reference an upcoming I- or P-picture, the display order of the pictures may not match the coding order of the pictures in the compressed data bitstream.

The second feature of MPEG coding is that code size is dynamically allocated by picture unit according to the complexity of the image. An MPEG decoder has an input buffer, and by accumulating data in this decoder buffer a large amount of code can be allocated to complex images that are difficult to compress.

Three types of audio coding are used for the audio portion of a DVD-RAM recording: MPEG audio with data compression, Dolby Digital® (also known as AC-3), and noncompressive linear pulse code modulation (LPCM). Both Dolby Digital® and LPCM are fixed bit rate coding methods, but MPEG audio coding can select from several compression rates on an audio frame basis, although audio compression is not as high as video stream compression.

The resulting compressed video and audio streams are multiplexed to a single stream using a method known as the MPEG system. FIG. 37 shows the organization of an MPEG system stream. As shown in FIG. 37, each 2 KB sector comprises a pack header 41, packet header 42, and payload 43. The MPEG system thus has a hierarchical structure comprising packs and packets. Each packet comprises a packet header 42 and payload 43. AV data is segmented from the beginning into blocks of an appropriate size for storage to the payload 43.

The packet header 42 records information referring to the AV data stored in the associated payload 43. More specifically, the packet header 42 contains a stream ID for identifying the data stored in the associated packet, and a decoding time stamp (DTS) and presentation time stamp (PTS) identifying the decoding time and presentation time of the data contained in the payload in 90 kHz precision. If the decoding and presentation are simultaneous, as in the case of audio data, the DTS can be omitted.

A pack is a unit of plural packets. In DVD-RAM, however, there is one pack for each packet, and each pack therefore comprises a pack header 41 and packet (containing a packet header 42 and payload 43).

The pack header contains a system clock reference (SCR) expressing with 27 MHz precision the time at which the data contained in this pack is input to the decoder buffer.

An MPEG system stream thus comprised is recorded one pack to a sector (=2048 bytes) on DVD-RAM.

A decoder for decoding the above-noted MPEG system stream is described next below. FIG. 38 is a block diagram of an exemplary decoder model (P_STD) of an MPEG system stream decoder. Shown in FIG. 38 are the system time clock (STC) 51, that is, the internal reference clock for decoder operation; a demultiplexer 52 for decoding (demultiplexing) the system stream; video decoder input buffer (video buffer) 53; video decoder 54; re-ordering buffer 55 for temporarily storing I and P pictures to absorb the difference in the coding (data) sequence and presentation sequence that occurs between B pictures and I and P pictures; a switch 56 for adjusting the output order of the I, P, and B pictures buffered to the re-ordering buffer 55; an audio decoder input buffer (audio buffer) 57; and audio decoder 58.

This MPEG system decoder processes the above-noted MPEG system stream as follows.

When the time indicated by the STC 51 and the SCR written to the pack header match, the pack is input to the demultiplexer 52. The demultiplexer 52 then interprets the stream ID in the packet header, and passes the audio stream and video stream contained in the payload data to the appropriate decoder buffers. The PTS and DTS are also read from the packet header.

When the times indicated by the STC 51 and DTS match, the video decoder 54 reads and decodes the picture data from the video buffer 53. I and P pictures are stored to the re-ordering buffer 55 while B pictures are presented directly to screen. If the picture being decoded by the video decoder 54 is an I or P picture, the switch 56 switches to the re-ordering buffer 55 to output the previous I or P picture from the re-ordering buffer 55; if a B picture is decoded, the switch 56 switches to the video decoder 54.

Similarly to the video decoder 54, the audio decoder 58 reads and decodes one audio frame of data from the audio buffer 57 when the PTS matches the STC 51 (a DTS is not recorded for audio data).

An exemplary method of multiplexing an MPEG system stream is described next with reference to FIG. 39. Note that a sequence of video frames is shown in FIG. 39(a), the change in data storage to the video buffer is shown in FIG. 39(b), a typical MPEG system stream is shown in FIG. 39(c), and an audio signal is shown in FIG. 39(d). Each of FIGS. 39 (a) to (d) are shown on a common time base (horizontal axis). The vertical axis in FIG. 39(b) indicates the amount of data stored to the video buffer. The bold line in this graph thus indicates the change over time in the buffered video data volume. The slope of this line is indicative of the video bit rate, and shows that data is input to the video buffer at a constant rate. The decrease in buffered data at regular intervals indicates the progression of data decoding. The intersection of the dotted line extension of the graphed line with the time base (horizontal axis) indicates the time at which video frame transfer to the video buffer begins.

MPEG encoding is described next using by way of example coding a complex image A in the video data stream. As shown in FIG. 39(b), image A requires a large coding block, and data transfer to the video buffer must therefore begin from a time t1 before the image A decoding time. Note that the time from data input start time t1 to decoding is referred to as vbv_delay below. AV data is thus multiplexed to the position (time) of the shaded video pack.

Unlike video data, audio data does not require dynamic coding size control. It is therefore not necessary for audio data transfer to start at a similarly advanced time before decoding starts, and audio data is thus typically multiplexed only slightly before decoding starts. Video data is thus multiplexed to the MPEG system stream before the audio data.

It should be further noted that data can be accumulated to the buffer for a limited time in the MPEG system. More specifically, the MPEG system standard requires all data other than still picture (or still image) data be output to the decoder from the buffer within one second of being stored to the buffer. This means that there is at most a one second offset between video data and audio data multiplexing (or more precisely, the time required for video frame reordering).

It will also be obvious that while the MPEG system stream is described above with video data preceding the audio, the audio can theoretically precede the video. This type of stream can be purposely generated by using for the video data simple images to which a high compression rate can be applied, and transferring the audio data earlier than required. Even in this case, however, the audio can precede the video by at most one second due to the restrictions imposed by the MPEG standard.

Reproduction Path

The AV data reproduction path is described next below.

As described above, data is recorded and reproduced from a simple linear path when using magnetic tape and other sequential access media. When plural AV streams are sequentially recorded to a single tape, the playback head must first be indexed to the desired stream before playback can start. Because output will be interrupted if a seek (head indexing) operation is performed to skip to another location on the tape while playback is in progress, AV streams by necessity must be linearly reproduced.

When using a random access medium such as optical discs, however, the high speed access capability of such media makes it possible to sustain continuous, uninterrupted output within certain parameters even when the playback head moves to AV data at a non-contiguous location on the disc by simply providing a track buffer of sufficient size between the decoder and drive.

It is therefore possible to define a plurality of playback (reproduction) paths on optical disc media. For example, discs conforming to the DVD-ROM video standard (DVD Specifications for Read-Only Disc, Part 3, Video Specifications) can be recorded so that the user can enjoy various different reproduction paths presenting different program content. Moving picture data, still picture data, audio, captioning data, and various other types of AV data can also be mixed in a single reproduction path for even greater variety.

Problem to be Solved

The object of the present invention is to provide a DVD recorder that solves the following problems hindering obtaining maximum performance from DVD-RAM media, a high capacity rewritable storage medium widely anticipated as the next generation in AV recording media.

The greatest problem resulting from a DVD recorder being able to define a plurality of reproduction paths is presenting these paths to the user. Multiple reproduction paths enhances user enjoyment, but can also lead to user confusion. That is, the availability of multiple reproduction paths makes it harder for the user to pick the desired path satisfying the user's personal objectives and desires. Further confusion can arise when the user does not know what type(s) of AV data are present on the various reproduction paths before playback starts.

For example, if the reproduction path comprises only moving picture content, the user can enjoy the program content until the AV stream ends without further manipulation required. However, if the reproduction path contains a group of still pictures, some type of operation is typically needed to continue to the next image. Furthermore, while there is obviously no video involved when reproducing an audio-only stream, if the user does not know that there is no associated video content to be reproduced with the audio, equipment failure or simply misunderstanding could result.

DVD-ROM video discs are frequently programmed with an easy to understand menu to the disc contents. This menu is prepared by the content creator, and also draws from the AV data content of the disc. Other information is also presented on the disc jacket or disc surface to inform the user.

With rewritable media such as DVD-RAM, however, the AV data content as well as reproduction path definitions can change, and the above-noted methods used with DVD-ROM are not as easily used.

The greatest problem in this regard with DVD-RAM and other rewritable media when using multiple reproduction paths is therefore achieving a method whereby reproduction path information can be appropriately presented to the user using the most recent data written to disc.

SUMMARY OF THE INVENTION

To achieve the above object, our invention relates to an optical disc for storing an AV stream containing at least one moving picture (video) stream or still picture (still image) stream, and management information for managing the AV stream wherein the management information comprises reproduction path information (UD_PGCI) generated by a user specifying a starting point and an ending point for a desired part of the AV stream, and play list type information (PL_TY) indicating whether the content of the user-defined reproduction path specified in the reproduction path information (UD_PGCI) is only video content, only still picture content, or a mixture of video and still picture content.

Our invention further relates to an optical disc for recording an AV stream containing at least one video or still picture stream, or an audio stream with no video or still picture content, and management information for managing the AV stream. In this case, the management information comprises reproduction path information (UD_PGCI) generated by a user specifying a starting point and an ending point for a desired part of the AV stream, and play list type information (PL_TY) indicating whether the content of the reproduction path specified in the reproduction path information (UD_PGCI) is only video content, only still picture content, a mixture of video and still picture content, or only audio content with no video or still picture content.

The play list information stored in the management information can be used to inform the user what type of content will be presented from each reproduction path before playback starts.

Further preferably in both cases above, the management information also comprises primary text information (PRM_TXTI) containing titles for the reproduction path information (UD_PGCI).

By storing title information for each user-defined reproduction path, a more informative, user-friendly display can be presented when informing the user of reproduction path content.

Our invention further relates to a recording device for recording management information to an optical disc of our invention as noted above. This recording device comprises memory for storing a user-defined starting point and ending point for a desired part of the AV stream; a means for generating user-defined reproduction path information based on the starting point and ending point stored to memory; a means (7802, steps #20 to #26) for generating play list type information (PL_TY) indicating whether the content of a user-defined reproduction path is only video content, only still picture content, or a mixture of video and still picture content; and a means for recording the reproduction path information and play list type information to the optical disc as management information.

Our invention yet further relates to a playback device for reproducing content from an optical disc to which an AV stream containing at least one video or still picture stream, and management information for managing the AV stream, are recorded with the management information containing user-defined reproduction path information generated by a user specifying a starting point and an ending point for a desired part of the AV stream, and play list type information (PL_TY) indicative of whether content contained in the user-defined reproduction path is only video content, only still picture content, or a mixture of video and still picture content. This playback device comprises a presentation means (7805, 7806) for reading the play list type information, and displaying whether the user-defined reproduction path contains only video content, only still picture content, or a mixture of video and still picture content.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 7 shows the VERN and TM_ZONE format;

FIG. 9 shows the PL_TY and PL_CREATE format;

FIG. 10 shows the PTM format;

FIG. 11 shows the S_VOB_ENTN format;

FIG. 13 shows the V_ATR and A_ATR format;

FIG. 14 shows the SP_ATR and SP_PLT format for movies;

FIG. 15 shows the structure of the M_AVFI block;

FIG. 17 shows the VOB_TY format;

FIG. 19 shows the VOBU_ENT format;

FIG. 21 shows the V_ATR and OA_ATRS_AA_STI format;

FIG. 22 shows the SP_ATR and SP_PLT format for still pictures;

FIG. 24 shows the structure of the S_VOB_ENT block;

FIG. 25 shows the S_VOB_ENT_TY format;

FIG. 29 shows the PG_TY format;

FIG. 31 shows the C_TY format;

FIG. 32 shows the structure of the C_EPI block;

FIG. 33 shows the EP_TY1 format;

FIG. 34 is a block diagram of a DVD recorder drive;

DESCRIPTION OF THE PREFERRED EMBODIMENTS

A DVD recorder and DVD-RAM disc are described below as a preferred embodiment of the present invention with reference to the accompanying figures.

Logical Structure of DVD-RAM

Figure 1:
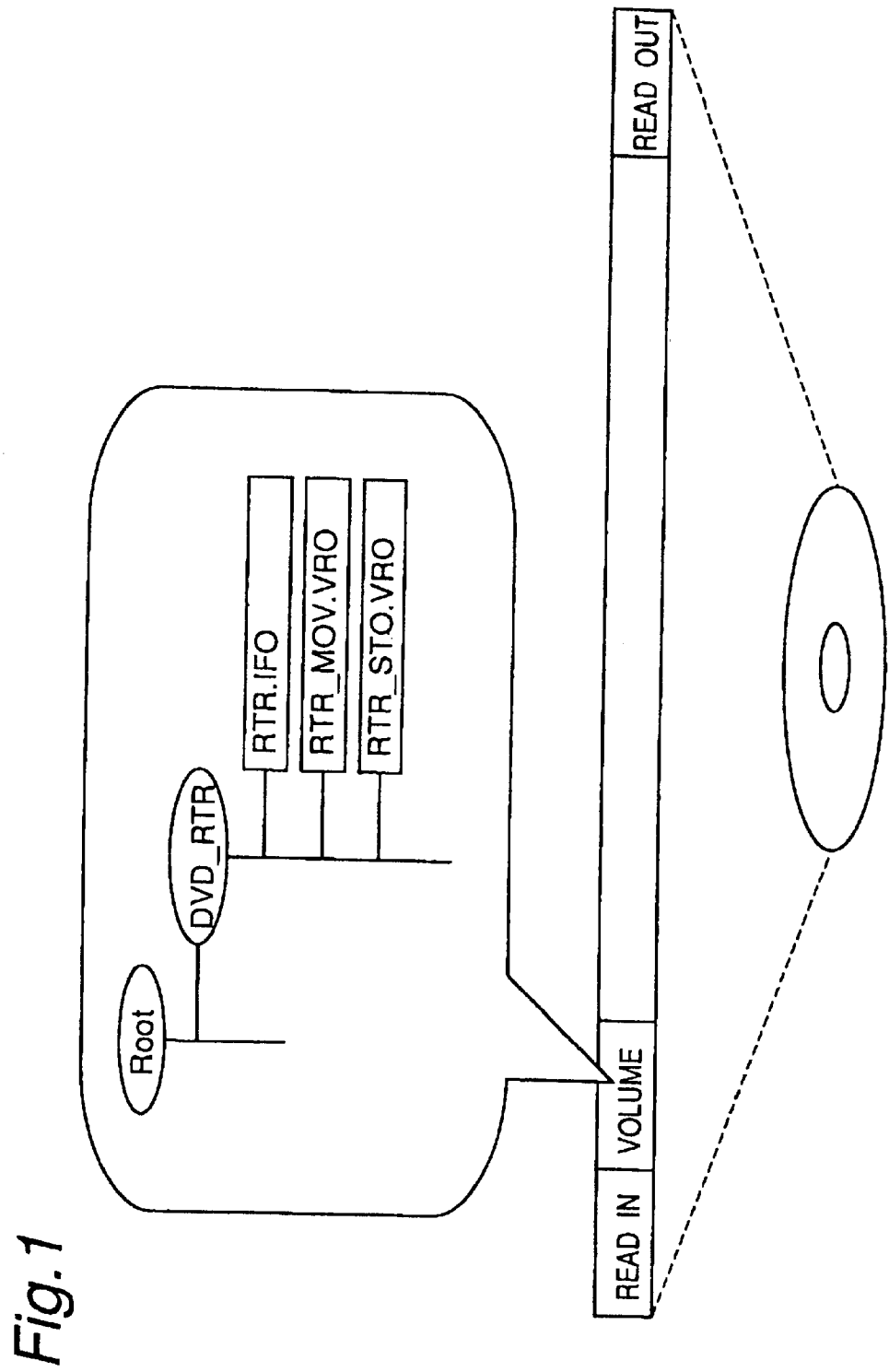
FIG. 1 shows the logical structure of a disc according to a preferred embodiment of the present invention.

The logical structure of a DVD-RAM disc is described first below with reference to FIG. 1. FIG. 1 shows the physical sector address area of the disc, and the structure whereby data is recorded to the disc as part of a file system.

The physical sector address area of the disc starts with a lead-in area to which a reference signal for servo stabilization, and an ID signal for differentiating DVD-RAM media from other media, are recorded. The user data area follows the lead-in area. Logically valid data is recorded to the user data area. A lead-out area ends the physical sector address area; a reference signal is also recorded here.

File system management information, called volume information, is recorded at the beginning of the user data area. The file system is not directly related to the present invention, and description thereof is thus omitted below. It should be noted, however, that by using a file system, data recorded to the disc can be managed as files and a directory to the files as shown in FIG. 1.

All data handled by the DVD recorder is filed under the DVD_RTR directory directly below the root directory as shown in FIG. 1.

Files handled by a DVD recorder can be grouped into two broad categories: a management information file (RTR.IFO file) and one or more AV files (RTR_MOV.VRO file, RTR_STO.VRO file).

AV files are recorded as an RTR_MOV.VRO file recording moving picture content (referred to as video below), or an RTR_STO.VRO file recording still picture data and simultaneously recorded audio data.

Figure 2:
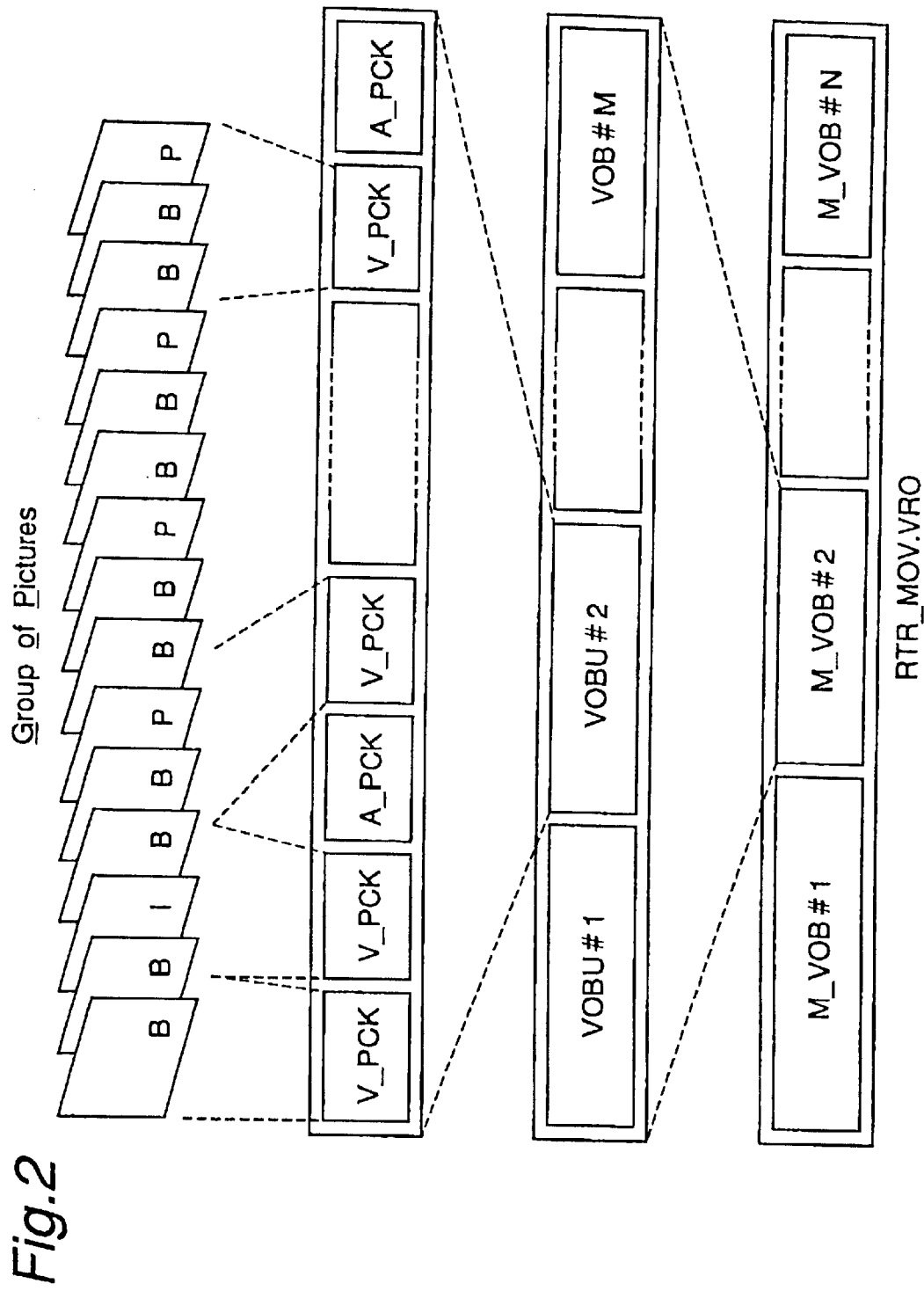
FIG. 2 shows the internal structure of an AV file for movies.

FIG. 2 shows the file structure of an RTR_MOV.VRO file recording video content. As shown in FIG. 2, MPEG program streams (M_VOB (Movie Video Object)) are arranged in recording sequence in the RTR_MOV.VRO file.

Each program stream (M_VOB) is built from a plurality of Video Object Units (VOBU), each with a video reproduction time of 0.4 sec. to 1.0 sec.

Each VOBU comprises a number of video packs (V_PCK), audio packs (A_PCK), and subpicture packs (SP_PCK); each pack is 2 KB.

The video data in each VOBU further comprises one or more Group of Pictures (GOP). The GOP is the decoding unit for MPEG video, starts with an I-picture, and contains plural P- or B-pictures.

Figure 3:
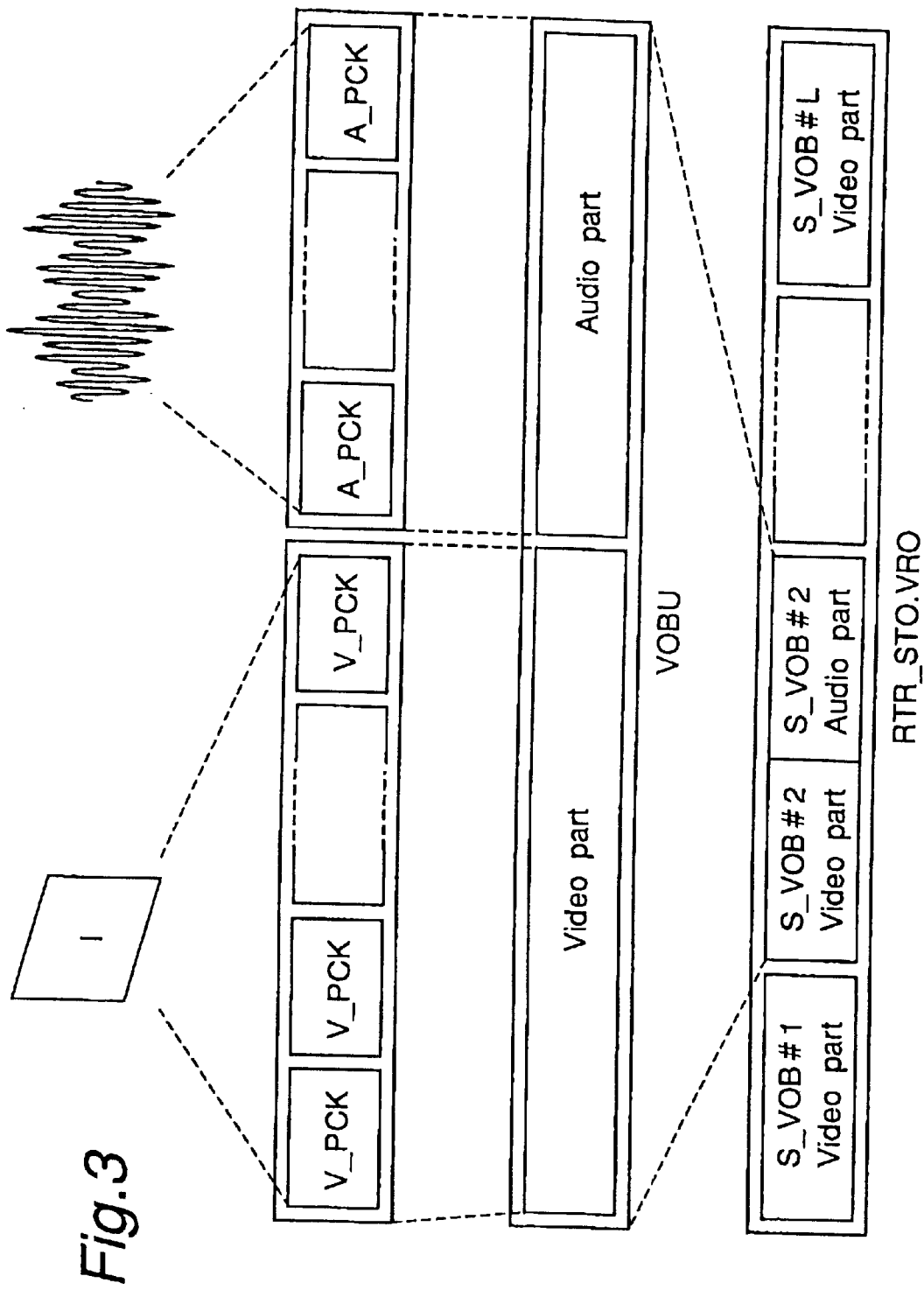
FIG. 3 shows the internal structure of an AV file for still pictures.

FIG. 3 shows the structure of an RTR_STO.VRO file for recording still pictures and audio data. As shown in FIG. 3, an RTR_STO.VRO file contains S_VOB (Still Picture Video Objects), the MPEG program stream for still pictures, arranged in recording sequence.

The greatest difference between an S_VOB and M_VOB is that an S_VOB records still picture data instead of moving picture data, and the still picture data (video part) is followed by the audio data (audio part) instead of multiplexing the video and audio.

An S_VOB also contains one VOBU, which comprises a V_PCK, A_PCK, and SP_PCK.

AV Data and Management Information

Figure 4:
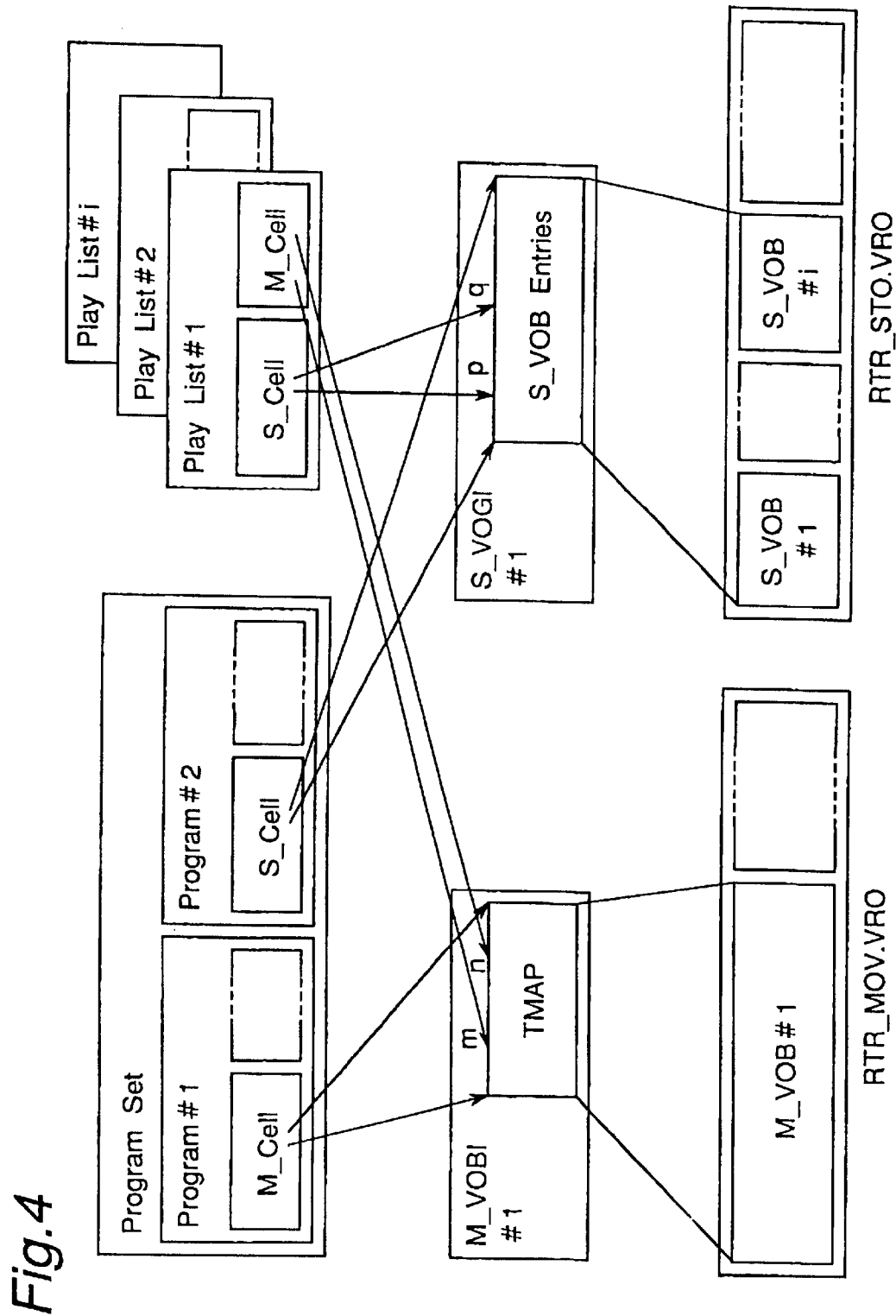
FIG. 4 shows the relationship between AV data and management information.
Figure 5:
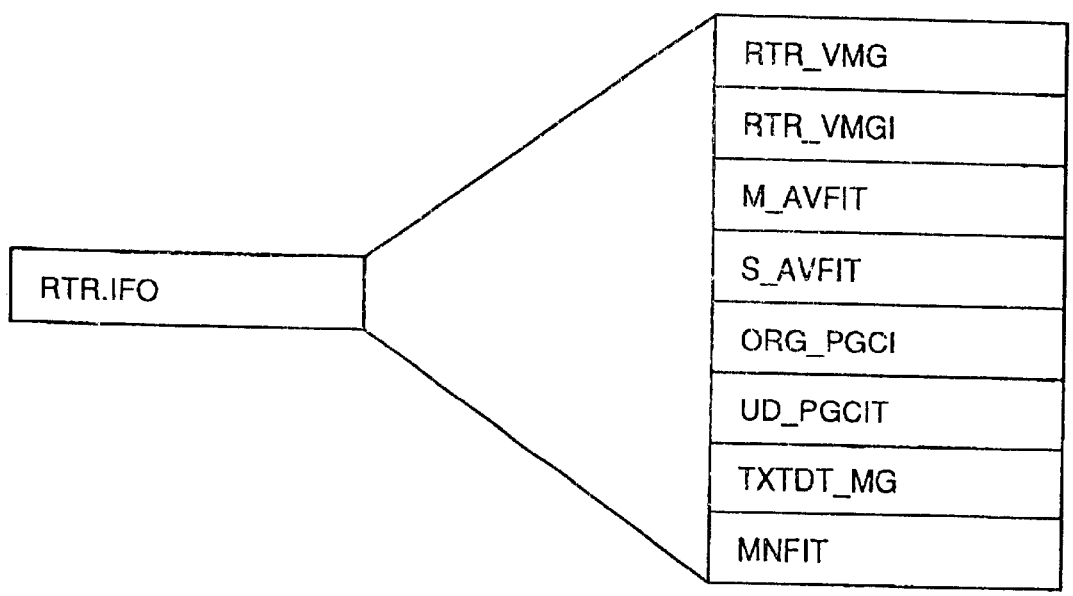
FIG. 5 shows the structure of the RTR_VMG block.
Figure 6:
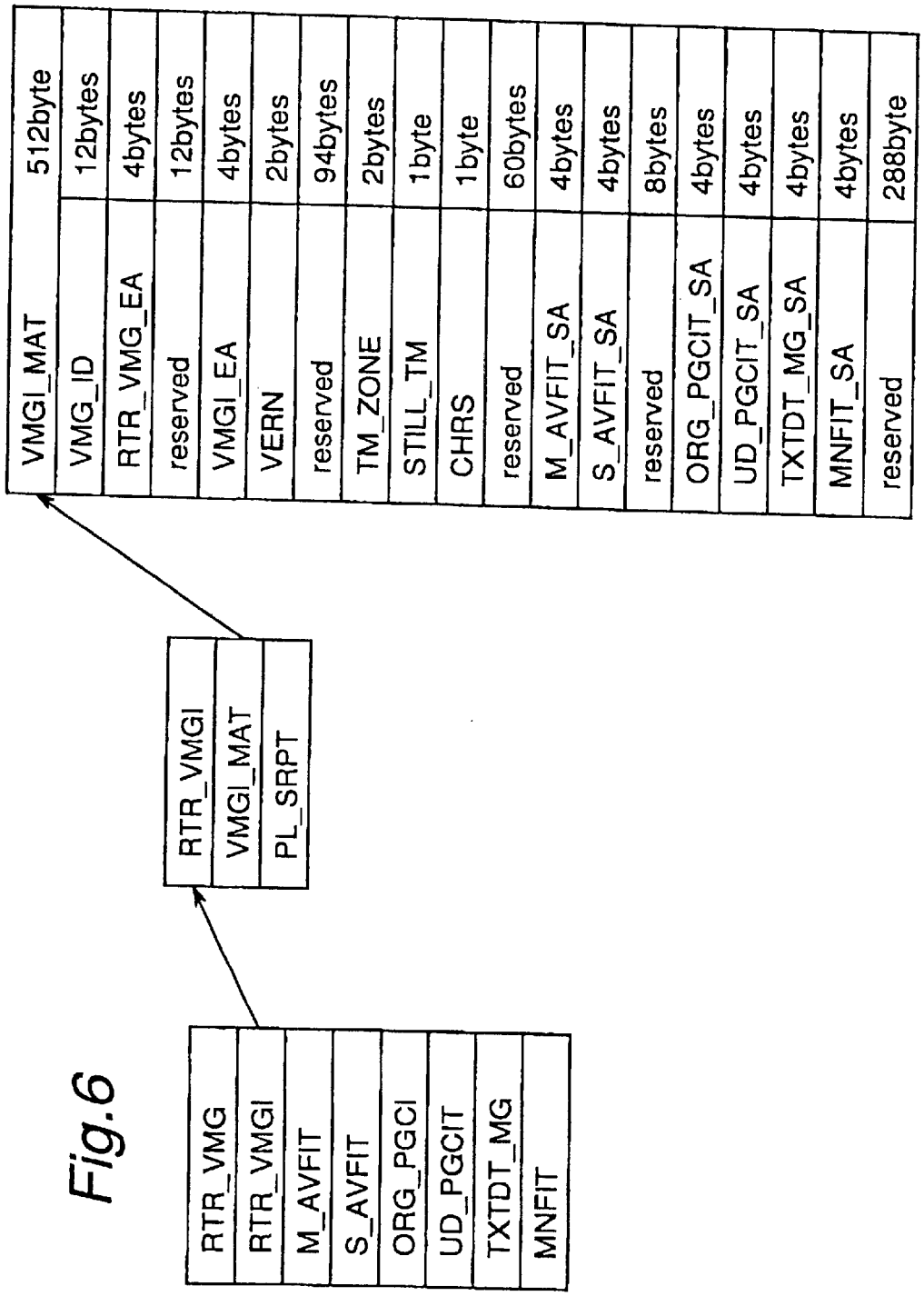
FIG. 6 shows the structure of the RTR_VMGI block.

The relationship between M_VOB, S_VOB, and management information is described next below with reference to FIG. 4.

As described above, there are two types of AV data, M_VOB and S_VOB. Management information M_VOBI for each M_VOB is stored for each M_VOB where the M_VOBI records attributes of the corresponding M_VOB. Individually managing S_VOBs, however, would greatly increase the amount of management information. Management information S_VOGI is therefore used to manage a group S_VOG containing plural S_VOB units. This S_VOGI records attributes for the corresponding S_VOB group.

What is important to note here is that MPEG stream data does not have a linear correlation between time and data size. As noted above, the MPEG system stream is compressed using temporal correlation characteristics and variable length coding techniques (including variable bit rate coding) in order to achieve high compression efficiency. As a result there is not necessarily a direct correlation between time and data size (address).

Therefore, an M_VOBI also contains a filter (TMAP) for converting time and address information, and an S_VOGI also contains a filter (S_VOB Entries) for converting a still picture number in an S_VOG group and address.

Management information for the reproduction path is described next below.

The reproduction path is defined as a program chain (PGC), that is, a sequence of cells, describing all or part of a range of M_VOB or S_VOG blocks.

The reproduction path can be either of two types: an original PGC referring to all AV data on the disc, or a user-defined PGC defining a user-selected reproduction sequence of AV data on the disc. Note that a plurality of user-defined PGC can be recorded.

The original PGC is also called a Program Set having a Program layer logically bundling a plurality of cells.

A user-defined PGC is also called a Play List. Unlike an original PGC, a Play List does not have a Program layer.

Management Information File

The content of the management information file RTR.IFO is described next below with reference to FIG. 5 to FIG. 33.

RTR_VMG (FIG. 5)

The VR_MANGR.IFO file contains real-time recording video management information RTR_VMG. RTR_VMG comprises seven tables: RTR_VMGI, M_AVFIT, S_AVFIT, ORG_PGCI, UD_PGCIT, TXTDT_MG, and MNFIT.

These seven tables are described in detail next below.

RTR_VMGI (FIG. 6)

Real-time recording video management information RTR_VMGI includes video management information table VMGI_MAT and lay list search pointer table PL_SRPT.

VMGI_MAT (FIG. 6)

The video management information management table VMGI_MAT stores the following information relating to the entire disc. The reproducing device and recording device, referred to as simply disc player and recorder, respectively, below, first read this VMGI_MAT to detect the overall structure of the disc.

VMG_ID (Video Management Identifier)

Stores the identifier DVD_RTR_VMG0 identifying the disc as storing video recording data.

RTR_VMG_EA (RTR_VMG End Address)

Stores the RTR_VMG end address.

VMGI_EA (VMGI End Address)

Stores the VMGI end address.

VERN (Version Number)

Records the version number of the recording format of the stored video recording data according to the format shown in FIG. 7.

TM_ZONE (Time Zone)

Records the time zone used for all time information recorded to the disc. As shown in FIG. 7, the TM_ZONE stores a time zone stamp TZ_TY indicating whether time information is based on Greenwich Mean Time or a regional time standard (such as Eastern Standard Time (EST) or Japan Standard Time (JST)), and a time zone offset TZ_OFFSET recording the time difference to Greenwich Mean Time.

STILL_TM (Still Time)

Stores the still time used for presenting still pictures without sound.

CHRS (Character Set Code for Primary Text Display)

Defines the character set code to use for primary text displays described below).

M_AVFIT_SA (M_AVFIT Start Address)

Stores the start address of the movie AV file information table M_AVFIT. This start address is used in the seek operation for accessing the M_AVFIT table.

S_AVFIT_SA (S_AVFIT Start Address)

Stores the start address of the still picture AV file information table S_AVFIT. This start address is used in the seek operation for accessing the S_AVFIT table.

ORG_PGCI_SA (ORG_PGCI Start Address)

Stores the start address of the original PGC information. This start address is used in the seek operation for accessing the original PGC.

UD_PGCIT_SA (UD_PGCIT Start Address)

Stores the start address of the user-defined PGC information table. This start address is used in the seek operation for accessing the user-defined PGC information table.

TXTDT_MG_SA (TXTDT_MG Start Address)

Stores the start address of the text data management information TXTDT_MG. This start address is used in the seek operation for accessing the text data management information TXTDT_MG.

MNFIT_SA (MNFIT Start Address)
Stores the start address of the management file information table MNFIT. This address is used in the seek operation for accessing the MNFIT table.

PL_SRPT (Play List Search Pointer Table) (FIG. 8)
The play list search pointer table PL_SRPT records play list search pointer table information PL_SRPTI and n play list search pointers PL_SRP.

PL_SRPTI (Play List Search Pointer Table Information) (FIG. 8)
The play list search pointer table information PL_SRPTI records the following information for accessing a play list search pointer PL_SRP.

PL_SRP_Ns (Number of Play List Search Pointers)
Stores the number of play list search pointers PL_SRP.

PL_SRPT_EA (PL_SRPT End Address)
Stores the end address of this play list search pointer table PL_SRPT.

PL_SRP (Play List Search Pointer) (FIG. 8)
Records the following information for accessing the actual play list data, that is, the user-defined PGC.

PL_TY (Play List Type)
Stores one of the following values for identifying the play list type using the format shown in FIG. 9.
 0000b: video only
 0001b: still pictures only
 0010b: both video and still pictures
 0011b: audio only PGCN (PGC Number)
Stores the PGC number for the associated play list. The PGC number is the recording sequence of PGC information in the UD_PGCIT described below.

PL_CREATE_TM (Play List Creation Date/time)
Stores the date and time the play list was created according to the format shown in FIG. 9.

PRM_TXTI (Primary Text Information)
Stores text information indicative of play list content. For example, if the play list is a television program, PRM_TXTI could record the name of the show. PRM_TXTI includes an ASCII code field, and a field for the character code set defined by the above-noted CHRS.

IT_TXT_SRPN (IT_TXT_SRP Number)
If information indicative of the play list content is recorded as the optional IT_TXT block in addition to the above-noted primary text, the IT_TXT_SRP number is stored as a link to the IT_TXT recorded in TXTDT_MG. This IT_TXT_SRP number is the recording sequence in TXTDT_MG, described below.

THM_PTRI (Thumbnail Pointer Information)
Stores thumbnail image information for the play list.

THM_PTRI (FIG. 8)
THM_PTRI stores the following information indicating a thumbnail image location.

CN (Cell Number)
Stores the cell number containing the thumbnail image. The cell number is the recording sequence of the cell information in the UD_PGCI for this play list.

THM_PT (Thumbnail Image Pointer)
Stores the presentation time of the video frame used as the thumbnail image according to the PTM (presentation time) describing format as shown in FIG. 10 if the cell indicated by CN is a video cell. PTM is written according to the reference time of the time stamp written in the MPEG program stream.
Stores the still picture VOB entry number of the still picture used as the thumbnail image according to the S_VOB_ENTN describing format as shown in FIG. 11 if the cell indicated by CN is a still picture cell.

M_AVFIT (FIG. 12)
The movie AV file information table M_AVFIT stores management information for the movie AV file RTR_MOV.VRO, and comprises M_AVFITI, M_VOB_STI, and M_AVFI.

M_AVFITI (Movie AV File Information Table Information) (FIG. 12)
Stores the following information for accessing M_VOB_STI and M_AVFI.

M_AVFI_Ns (Movie AV File Information Number)
Indicates the number of following AVFI information fields. If 0, no AVFI is present; if 1, an AVFI is present. AVFI presence corresponds to the presence of movie AV file RTR_MOV.VRO.

M_VOB_STI_Ns (M_VOB_STI Number)
Indicates the number of following M_VOB_STI fields.

M_AVFIT_EA (M_AVFIT End Address)
Stores the M_AVFIT end address.

M_VOB_STI (Movie VOB Stream Information) (FIG. 12)
Stores the following as movie VOB stream information.

V_ATR (Video Attributes)
Stores the following video attributes according to the format as shown in FIG. 13.
Video Compression Mode
Stores one of the following values indicating the video compression mode.
 00b: MPEG_1
 01b: MPEG_2
TV System
Stores one of the following values indicating the television system.
 00b: 525/60 (NTSC)
 01b: 625/50 (PAL)
Aspect Ratio
Stores one of the following values indicating the aspect ratio.
 00b: 4×3
 01b: 16×9
line21_switch_1
Stores one of the following values indicating whether closed caption data for field 1 is contained in the video stream.
 1b: recorded
 0b: not recorded
line21_switch_2
Stores one of the following values indicating whether closed caption data for field 2 is contained in the video stream.
 1b: recorded
 0b: not recorded
Video Resolution
Stores one of the following values indicating the video resolution.
 000b: 720×480 (NTSC), 720×576 (PAL)
 001b: 702×480 (NTSC), 702×576 (PAL)
 010b: 352×480 (NTSC), 352×576 (PAL)
 011b: 352×240 (NTSC), 352×288 (PAL)
 100b: 544×480 (NTSC), 544×576 (PAL)
 101b: 480×480 (NTSC), 480×576 (PAL)

AST_Ns (Audio Stream Number)
Stores the number of audio streams recorded to the corresponding VOB.

SPST_Ns (Still Picture Stream Number)
Stores the number of still picture streams recorded to the corresponding VOB.

A_ATR0 (Audio Stream 0 Attributes)

Stores the following attributes for the audio recorded to audio stream 0 using the format as shown in FIG. 13.

Audio Coding Mode

Stores one of the following values indicating the audio compression method.

000b: Dolby AC-3
001b: MPEG audio without an extension stream
010b: MPEG audio with an extension stream
011b: linear PCM Preference Flag Stores one of the following values indicating user preference information for the audio channel.

00b: not applicable
01b: audio channel 1
10b: audio channel 2

For example, if audio channel 1 is in Japanese, audio channel 2 is in English, and the user prefers to listen in English, this preference flag is set to 10b by the user.

Application Flag

Stores one of the following values indicating the audio application.

00b: not applicable
01b: plural audio channel configurations are mixed
10b: enhancement channel included Note that a value of 01b indicating plural audio channel configurations are mixed means, for example, that two or more audio streams of monaural, stereo, or dual audio (such as in both Japanese and English) are recorded to the AV stream on separate time bases.

The enhancement channel is an enhanced audio channel for the visually impaired.

Quantization/DRC

Stores one of the following values for identifying whether dynamic range control (DRC) information is present.

00b: DRC not contained in MPEG stream
01b: DRC contained in MPEG stream

If LPCM is used, the following value is stored to identify the quantization level.

00b: 16 bit fs

The following value is stored to identify the sampling frequency.

00b: 48 kHz

Number of Audio Channels

Stores one of the following values indicating the number of audio channels.

0000b: 1 channel (monaural)
0001b: 2 channel (stereo)
0010b: 3 channel
0011b: 4 channel
0100b: 5 channel
0101b: 6 channel
0110b: 7 channel
0111b: 8 channel
1001b: 2 channel (dual monaural)

Dual monaural refers, for example, to a bilingual recording with main (e.g., Japanese) and sub (e.g., English) channels, both of which are monaural.

Bitrate

Stores one of the following values indicating the bitrate.

0000 0001b: 64 kbps
0000 0010b: 89 kbps
0000 0011b: 96 kbps
0000 0100b: 112 kbps
0000 0101b: 128 kbps
0000 0110b: 160 kbps
0000 0111b: 192 kbps
0000 1000b; 224 kbps
0000 1001b: 256 kbps
0000 1010b: 320 kbps
0000 1011b: 384 kbps
0000 1100b: 448 kbps
0000 1101b: 768 kbps
0000 1110b: 1536 kbps What is important here is that if the corresponding audio stream is an MPEG audio stream with an extension stream, only the bitrate of the base stream, not including the extension stream, is recorded. This is because compression using a VLC technique is used for the extension stream, and the extension stream therefore cannot be defined using a fixed bitrate as above.

A_ATR1 (Audio Stream 1 Attributes)

Stores the following attributes of audio stream 1 using the format as shown in FIG. 13. Note that these attributes are defined using the same fields used with A_ATR0 and described above, and further description is thus omitted here.

Figure 43:
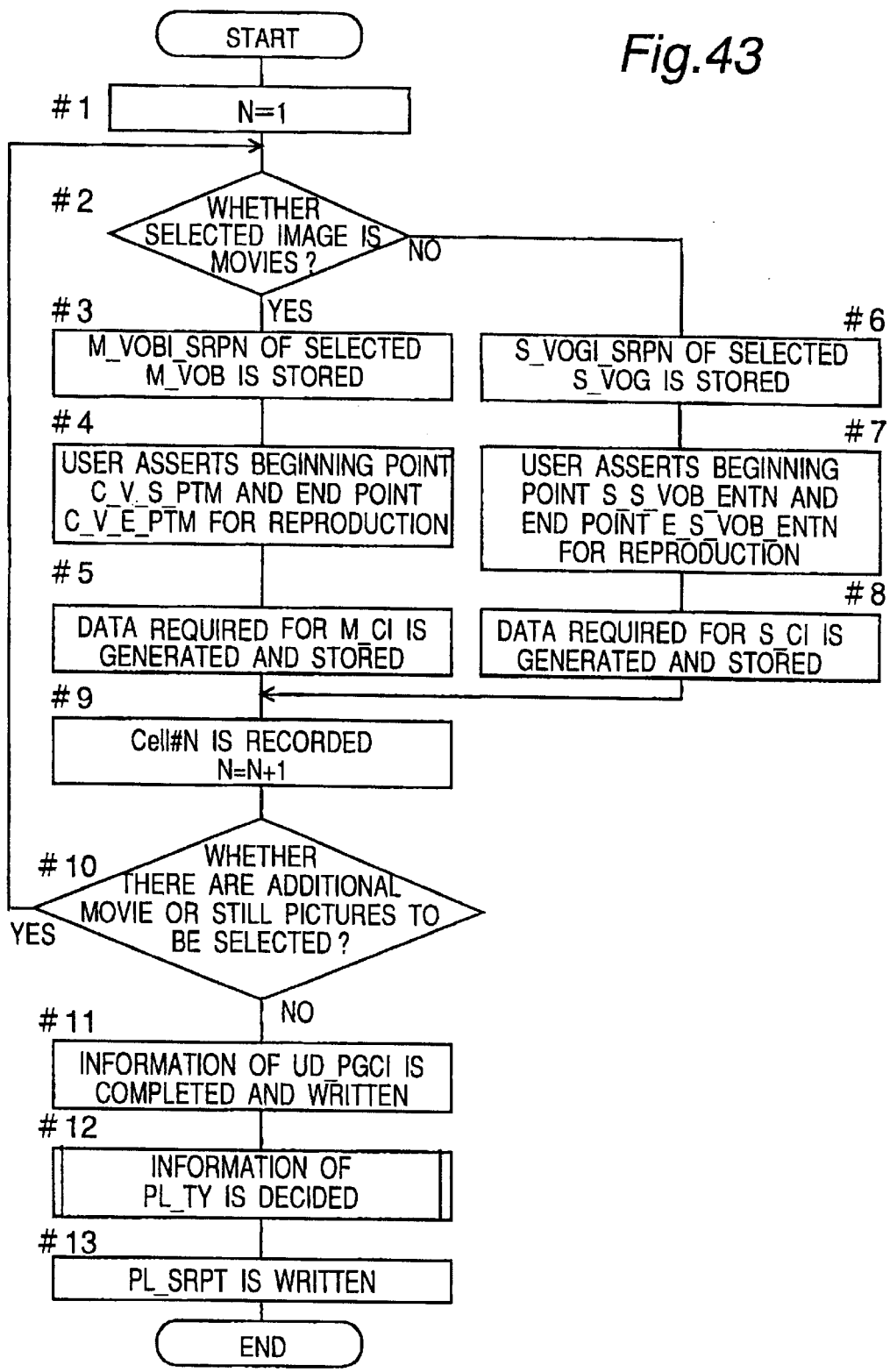
FIG. 43 is a flow chart of a play list recording operation.

As shown in FIG. 43, if there are two audio streams (audio stream 1 and audio stream 2) for a single AV stream, A_ATR0 is used for audio stream 1 management information, and A_ATR1 is used for audio stream 2 management information. Because A_ATR0 and A_ATR1 are identical in structure, A_ATR0 shown on the bottom in FIG. 13 is also applicable to A_ATR1.

One possible application for two audio streams is to broadcast a baseball game, for example, with announcer commentary for one team broadcast in stereo on audio stream 1, and the announcer commentary for the other team broadcast in stereo on audio stream 2.

Figure 44:
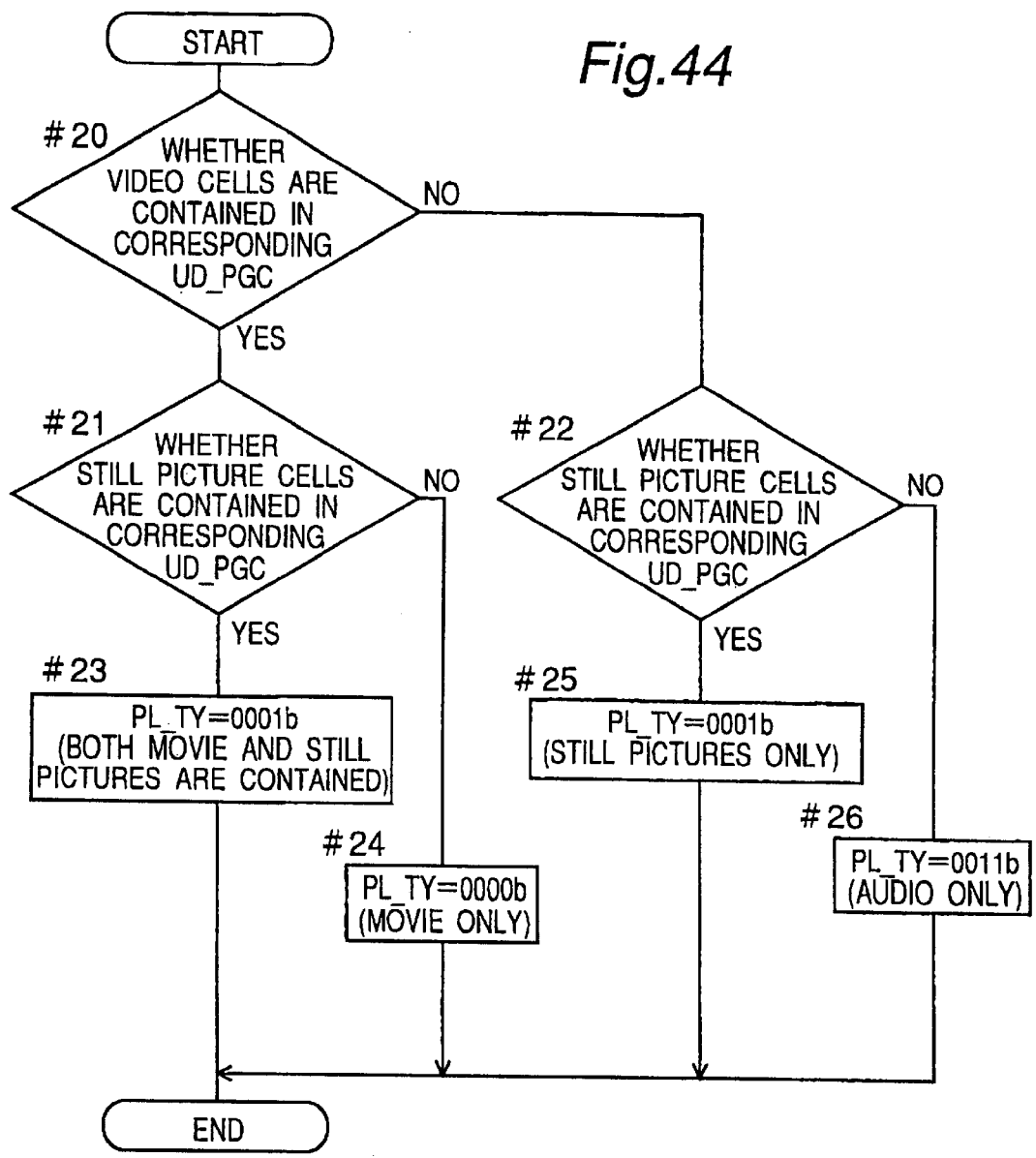
FIG. 44 is a flow chart of an operation for generating play list type information.

If there is only one audio stream, that is, audio stream 1 in this case as shown in FIG. 44, A_ATR0 is used for the audio stream 1 management information while A_ATR1 is left blank or as initialized.

Figure 45:
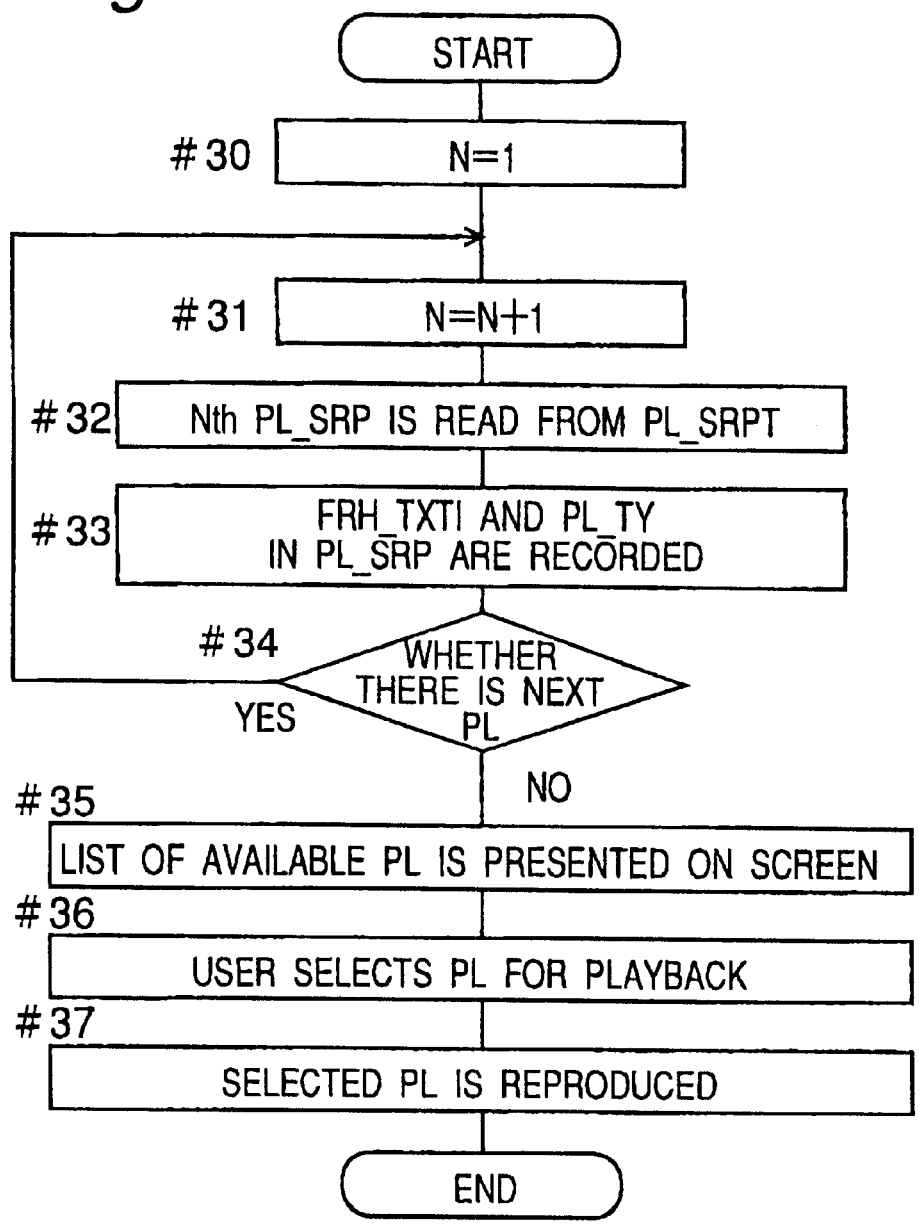
FIG. 45 is a flow chart of a process for generating a play list presentation screen.

Furthermore, if audio streams 1 and 2 are both recorded for a single AV stream, A_ATR0 is used for audio stream 1 management information, and A_ATR1 is used for audio stream 2 management information. By setting the preference flag to 10b in A_ATR1 as shown in FIG. 45, audio channel 2, that is, the subchannel, can be designated the preferred channel and selected with priority to audio channel 1. Furthermore, by setting the application flag to 01b it is known that a plurality of audio channels are mixed. By further setting the number of audio channels to 1001b, it is known that two channel (dual monaural) audio is the preferred mode. Which is the preferred or representative mode when there are plural modes can be detected by, for example, comparing the total time of each mode and selecting the mode with the longest time, or sending a code in the broadcast signal indicating a preselected preferred mode.

SP_ATR (Subpicture Attribute)

Records the subpicture attribute information shown below according to the format as shown in FIG. 14.

Application Flag

Stores one of the following values indicating the application type.

00b: not applicable
01b: caption
10b: animation

SP_PLT (Subpicture Color Palette)

Records the subpicture color palette information using the format shown in FIG. 14.

M_AVFI (FIG. 15)

The movie AV file information M_AVFI comprises the following information for accessing a movie VOB: M_AVFI_GI, M_VOBI_SRP, and M_VOBI.

Figure 15:
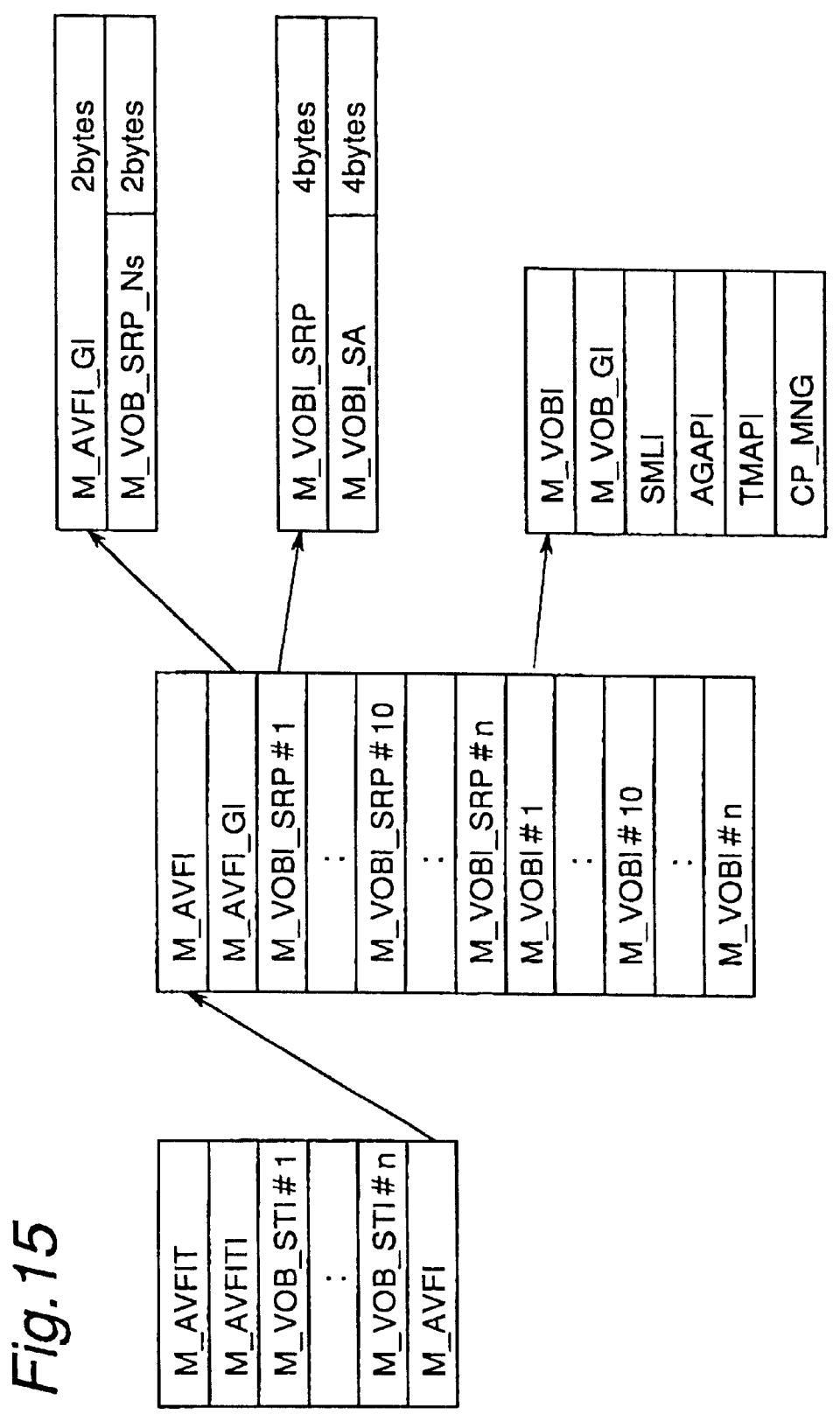

M_AVFI_GI (Movie AV File General Information) (FIG. 15)

Stores the movie VOB information search pointer count M_VOBI_SRP_Ns.

M_VOBI_SRP_Ns (Movie VOB Information Search Pointer Number)

Records the number of movie VOB information search pointers M_VOBI_SRP.

M_VOBI_SRP (Movie VOB Information Search Pointer) (FIG. 15)

Stores address information for accessing each M_VOBI.

M_VOBI_SA (Movie VOB Information Start Address)

Stores the M_VOBI start address used for a seek operation accessing the corresponding VOBl information.

Figure 16:
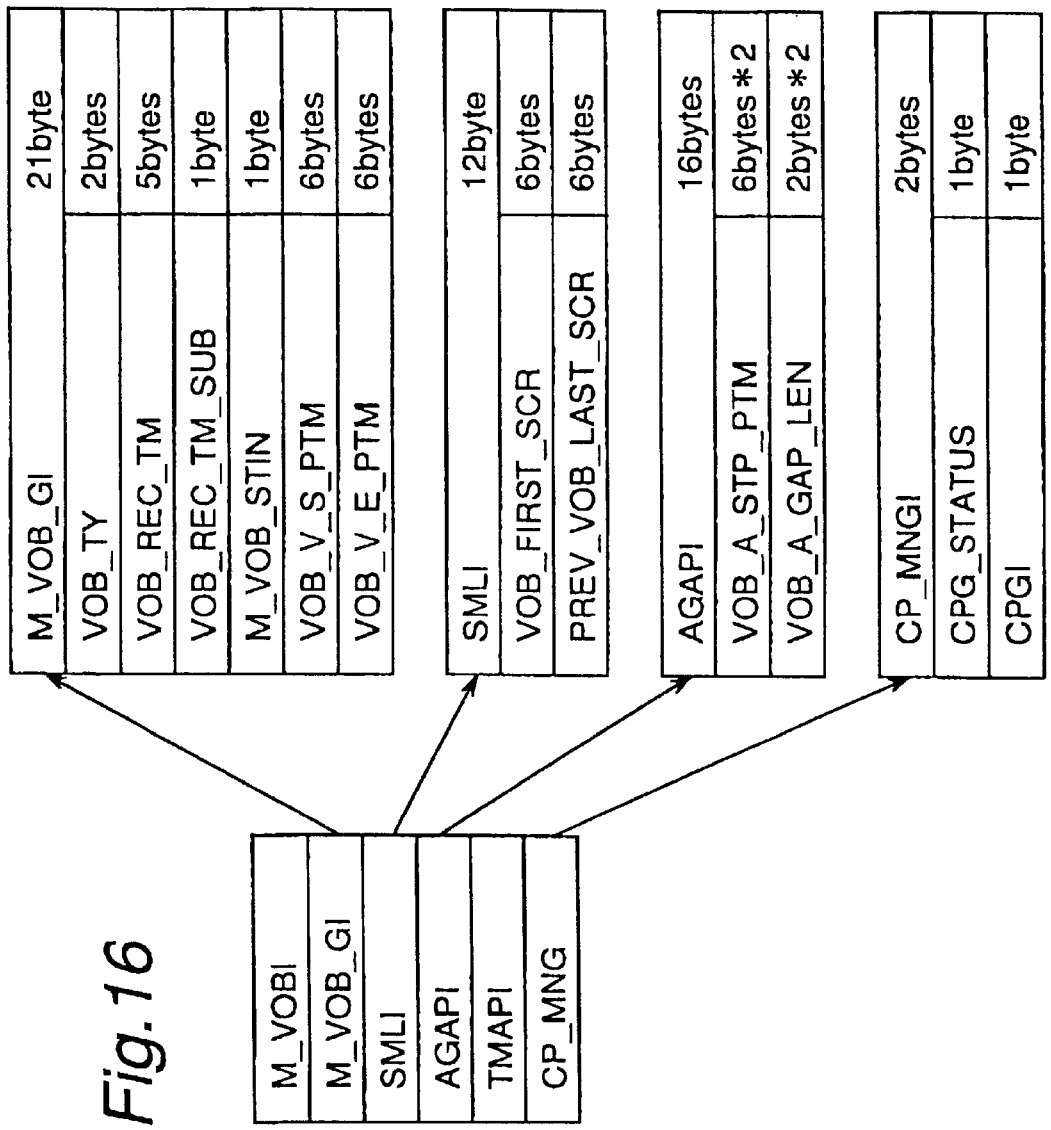
FIG. 16 shows the structure of the M_VOBI block.
Figure 18:
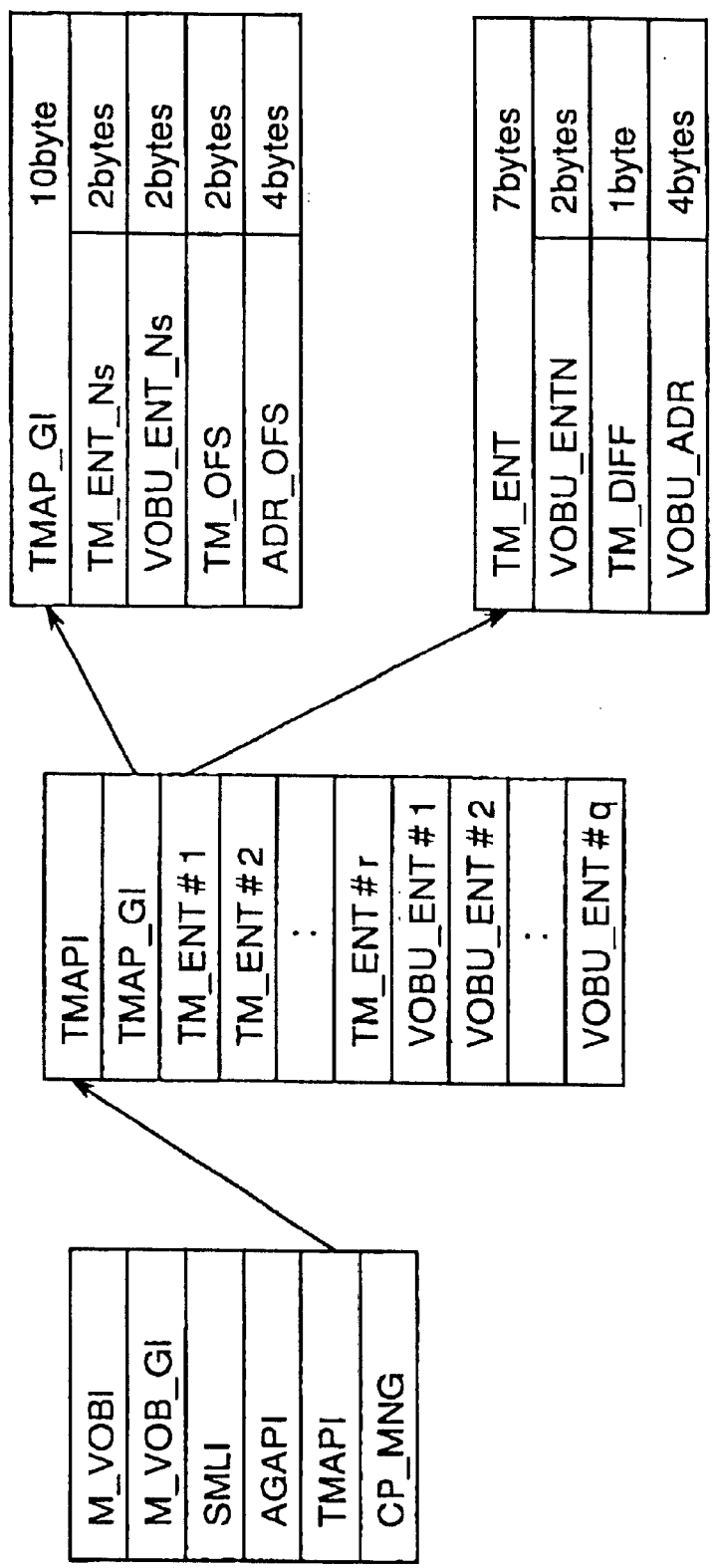
FIG. 18 shows the structure of the TMAPI block.
Figure 20:
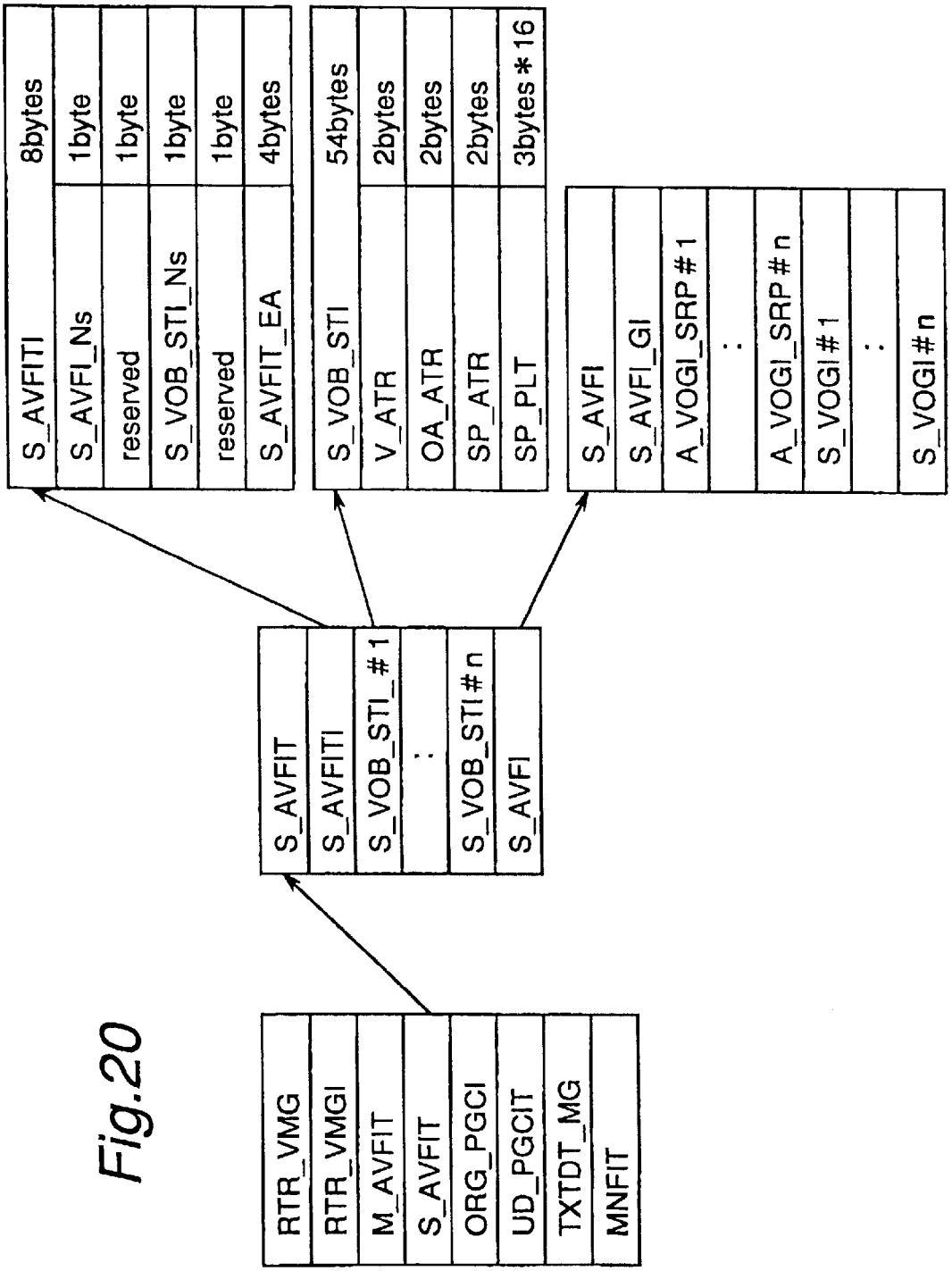
FIG. 20 shows the structure of the S_AVFIT block.

M_VOBI (Movie VOB Information) (FIG. 16)

Stores the following movie VOB management information: M_VOB_GI, SMLI, AGAPI, TMAPI, and CP_MNGI.

M_VOB_GI (General Information) (FIG. 16)

Records the following general information relating to a movie VOB.

VOB_TY (VOB Type)

Stores VOB attributes according to the format as shown in FIG. 17.

TE

Stores one of the following values indicating the VOB status.

0b: normal
1b: temporarily or partially deleted

A0_STATUS

Stores one of the following values indicating the status of audio stream 0.

00b: original state
01b: overwritten

A1_STATUS

Stores one of the following values indicating the status of audio stream 1.

00b: original state
01b: overwritten
10b: dummy for additional audio content
11b: additional audio content added

APS

Stores one of the following values indicating the analog copy prevention control signal state.

00b: analog copy protection not enabled
01b: type 1
10b: type 2
11b: type 3

SML_FLG

Stores one of the following values indicating whether the VOB is to be seamlessly reproduced with the preceding VOB.

0b: seamless reproduction not possible
1b. seamless reproduction possible

A0_GAP_LOC

Stores one of the following values indicating the presence of an audio reproduction gap in audio stream 0, and identifying the VOBU to which the audio reproduction gap is multiplexed.

00b: no audio reproduction gap recorded
01b: audio reproduction gap multiplexed to first VOBU
10b: audio reproduction gap multiplexed to second VOBU
11b: audio reproduction gap multiplexed to third VOBU

A1_GAP_LOC

Stores one of the following values indicating the presence of an audio reproduction gap in audio stream 1, and identifying the VOBU to which the audio reproduction gap is multiplexed.

00b: no audio reproduction gap recorded
01b: audio reproduction gap multiplexed to first VOBU
10b: audio reproduction gap multiplexed to second VOBU
11b: audio reproduction gap multiplexed to third VOBU VOB_REC_TM (VOB Recording Date/time)

The date and time the VOB was recorded is stored in the same format used for PL_CREATE_TM shown in FIG. 9. What is important to note here is that this indicates the date/time that the first video presentation frame of the VOB was recorded. If the first video frame is changed by editing or deletion, this VOB_REC_TM value must be updated. It should be further noted that the date/time of recording can be displayed synchronized to the VOB presentation similarly to the way a date/time is displayed on the viewfinder of a video camcorder by simply adding the time elapsed in the VOB to the time stored as VOB_REC_TM.

VOB_REC_TM_SUB (VOB Recording Date/time Difference Information)

This field is used to absorb error in a VOB_REC_TM field that has been updated because the first video frame in the VOB was changed by VOB editing or deletion. As shown in FIG. 9, VOB_REC_TM is only accurate to the second. This means that if the video was edited or deleted at the frame or field level (precision), the recording time cannot be expressed with sufficient accuracy using only VOB_REC_TM. This field is therefore used to adjust for any difference.

M_VOB_STIN (M_VOB_STI Number)

Stores the M_VOB_STI number corresponding to the VOB. This M_VOB_STI number is the recording sequence in the above-noted M_VOB_STI table.

VOB_V_S_PTM (VOB Video Start PTM)

Stores the VOB presentation start time based on the same reference time as the time stamp of the video stream.

VOB_V_E_PTM (VOB Video End PTM)

Stores the VOB presentation end time based on the same reference time as the time stamp of the video stream. It should be noted that the time stamp of the stream indicates the presentation start time of the frame, but this VOB_V_E_PTM field records the presentation end time, that is, the sum of the start time plus the frame presentation period.

SMLI (Seamless Information) (FIG. 16)

SMLI stores the following information required for seamless reproduction with the preceding VOB. Note that this field is only recorded when the above-noted SML_FLG is 1b.

VOB_FIRST_SCR

Stores the SCR of the first pack in the VOB.

PREV_VOB_LAST_SCR

Stores the SCR of the last pack in the previous VOB.

AGAPI (Audio Gap Information) (FIG. 16)

AGAPI records the following information required for the decoder to process an audio reproduction gap. This field is only recorded when a value other than 00b is written to the above-noted A0_GAP_LOC or A1_GAP_LOC.

VOB_A_STP_PTM (VOB Audio Stop PTM)

Records the time of the audio reproduction gap, that is, the time at which the decoder is to temporarily stop audio reproduction. This time is recorded using the same reference time as the stream time stamp.

VOB_A_GAP_LEN (VOB Audio Gap Length)

Records the length of the audio reproduction gap in 90 kHz precision.

CP_MNGI (Copy Management Information) (FIG. 16)

Records the copy management information for the corresponding VOB, and comprises CPG_STATUS and CPGI.

CPG_STATUS (Copy Protection Status)

Stores a value used for VOB copy protection. CPG_STATUS indicates whether content can be freely copied or whether only a first generation copy can be made.

CPGI (Copy Protection Information)
Records the copy protection information applied to the corresponding VOB.

TMAPI (Time Map Information) (FIG. 18)
The time map information comprises TMAP_GI, TM_ENT, and VOBU_ENT fields.

TMAP_GI (FIG. 18)
The general TMAP information TMAP_GI comprises TM_ENT_Ns, VOBU_ENT_Ns, TM_OFS, and ADR_OFS fields as described below.

TM_ENT_Ns (TM_ENT Number)
Records the number of TM_ENT fields in the TMAPI block as described below.

VOBU_ENT_Ns (VOBU_ENT Number)
Records the number of VOBU_ENT fields in the TMAPI block as described below.

TM_OFS (Time Offset)
Records the time map offset with the video field precision.

ADR_OFS (Address Offset)
Records the offset in the first AV field in the VOB.

TM_ENT (Time Entry) (FIG. 18)
A time entry comprises the following fields as access point information at a constant time interval TMU. If the video format is NTSC, the TMU is 600 video fields; if PAL, it is 500 video fields.

VOBU_ENTN (VOBU_ENT Number)
Records the entry number of a VOBU containing the time (TMU×(N−1)+TM_OFS for the N-th TM_ENT) indicated by the TM_ENT.

TM_DIFF (Time Difference)
Records the difference between the time indicated by this TM_ENT and the presentation start time of the VOBU pointed to by VOBU_ENTN.

VOBU_ADR (VOBU Address)
Records the start address in the VOB of the VOBU pointed to by VOBU_ENTN.

VOBU_ENT (FIG. 19)
The VOBU entry (VOBU_ENT) has the fields shown below for the corresponding VOBU. The fields are formatted as shown in FIG. 19. The time and address information required to access a desired VOBU can be obtained by simply adding the following fields in sequence.

1STREF_SZ
Stores the number of packs from the first pack in the VOBU to the pack containing the last data block of the first I-picture in the VOBU.

VOBU_PB_TM
Records the playback time of this VOBU.

VOBU_SZ
Records the data size of this VOBU.

S_AVFIT (FIG. 20)
The still picture AV file information table comprises the following management information fields for the still picture AV file RTR_STO.VRO: S_AVFITI, S_VOB_STI, S_AVFI.

S_AVFITI (Still Picture AV File Information Table Information) (FIG. 20)
Stores the following information required to access S_VOB_STI and S_AVFI.

S_AVFI_Ns (Still Picture AV File Information Number)
This is a value of either 0 or 1. This value corresponds to the number of still picture AV files, that is, RTR_STO.VRO file presence.

S_VOB_STI_Ns (Still Picture VOB Stream Information Number)
Records the number of S_VOB_STI described below.

S_AVFI_EA (Still Picture AV File Information End Address)
Records the S_AVFI end address.

S_VOB_STI (Still Picture VOB Stream Information) (FIG. 20)
Records the following still picture VOB stream information.

V_ATR (Video Attributes)
Information recorded as the video attributes are the Video compression mode, TV system, Aspect ratio, and Video resolution. These fields are as described above with reference to the video attributes V_ATR of the M_VOB_STI.

OA_ATR (Audio Stream Attributes)
The audio stream attribute fields are: Audio coding mode, Application Flag, Quantization/DRC, fs, Number of Audio channels. These are also as described above with reference to the A_ATR0 fields of the M_VOB_STI.

SP_ATR (Subpicture Attributes)
The Application Flag is recorded for the subpicture attributes. This field is the same as SP_ATR described above with reference to M_VOB_STI.

SP_PLT (Subpicture Color Palette)
Stores the color palette information for subpictures. The format is as described with reference to the SP_PLT of M_VOB_STI.

S_AVFI (Still Picture AV File Information) (FIG. 23)
Comprises the following fields required to access a still picture VOG: S_AVFI_GI, S_VOGI_SRP, and S_VOGI.

S_AVFI_GI (FIG. 23)
General still picture AV file information S_AVFI_GI records S_VOGI_SRP_Ns.

S_VOGI_SRP_Ns (Still Picture VOB Group Search Pointer Number)
Records the number of S_VOGI_SRP fields described below.

S_VOGI_SRP (Still Picture VOB Group Information Search Pointer) (FIG. 23)
Records S_VOGI_SA.

S_VOGI_SA (Still Picture VOB Group Information Start Address)
records the start address of this S_VOGI.

S_VOGI (FIG. 23)
The still picture VOB group information S_VOGI comprises the following still picture VOB management information fields: S_VOG_GI, S_VOB_ENT, CP_MNGI.

S_VOG_GI (FIG. 23)
General still picture VOB group information S_VOG_GI records the following fields as general information relating to the still picture VOB group.

S_VOB_Ns (Still Picture VOB Number)
Records the number of still picture VOBs in the still picture VOB group.

S_VOB_STIN (S_VOB_STI Number)
Records the S_VOB_STI number storing the still picture VOB stream information. This S_VOB_STI number is the recording sequence in the S_VOB_STI table.

FIRST_VOB_REC_TM (First VOB Recording Date/time)
Records the recording date/time information of the first still picture VOB in the still picture VOB group.

LAST_VOB_REC_TM (Last VOB Recording Date/Time)
Records the recording date/time information of the last still picture VOB in the still picture VOB group.

S_VOB_SA (Still Picture VOB Group Start Address)
Records the start address of the still picture VOB group in the RTR_STO.VRO file.

CP_MNGI (Copy Management Information)

Records copy management information relating to the corresponding still picture VOB group. The fields thereof are the same as the above-described CP_MNGI for movie VOB information M_VOBI.

S_VOB_ENT (FIG. 24)

Still picture VOB entries S_VOB_ENT are defined as either type A or type B as described below according to whether there is audio recorded for individual still picture VOBs in the still picture VOB group.

S_VOB_ENT (Type A) (FIG. 24)

Type A comprises the fields S_VOB_ENT_TY and V_PART_SZ, defined as follows.

S_VOB_ENT_TY (Still Picture VOB Entry Type)

Still picture VOB type information is formatted as shown in FIG. 25.

MAP_TY

Stores one of the following values for identifying type A or type B.
00b: type A
01b: type B

TE

Stores one of the following values indicating the status of the still picture VOB.
0b: normal
1b: temporarily or partially deleted SPST_Ns Stores the number of subpicture streams in the still picture VOB.

V_PART_SZ (Video Part Size)

Stores the data size of the video part of the still picture VOB.

S_VOB_ENT (Type B) (FIG. 24)

In addition to S_VOB_ENT_TY and V_PART_SZ fields, type B also has A_PART_SZ and A_PB_TM fields as defined below.

S_VOB_ENT_TY (Still Picture VOB Entry Type)

Records the type of the still picture VOB. These fields are as described above with reference to type A.

V_PART_SZ (Video Part Size)

Stores the data size of the video part of the still picture VOB.

A_PART_SZ (Audio Part Size)

Stores the data size of the audio part of the still picture VOB.

A_PB_TM (Audio Playback Time)

Stores the playback time (length) of the audio part of the still picture VOB.

UD_PGCIT (FIG. 26)

The user-defined PGC information table comprises the following fields: UD_PGCITI, UD_PGCI_SRP, and UD_PGCI.

UD_PGCITI (FIG. 26)

The user-defined PGC information table information UD_PGCITI records the following fields constituting the user-defined PGC information table.

UD_PGCI_SRP_Ns (User-defined PGC Information Search Pointer Number)

Records the number of UD_PGCI_SRP fields.

UD_PGCIT_EA (User-defined PGC Information Table End Address)

Records the UD_PGCIT end address.

UD_PGCI_SRP (FIG. 26)

The user-defined PGC information search pointer UD_PGCI_SRP records the UD_PGCI_SA field.

UD_PGCI_SA (User-defined PGC Information Start Address)

Records the UD_PGCI start address. This address is used to seek and access the PGCI.

UD_PGCI (FIG. 26)

The detailed structure of the user-defined PGC information is described further below under the PGC information PGCI.

ORG_PGCI (FIG. 5)

The detailed structure of the original PGC information is described further below under the PGC information PGCI.

TXTDT_MG (FIG. 27)

The text data management field TXTDT_MG comprises TXTDTI, IT_TXT_SRP, and IT_TXT fields as described below.

TXTDTI (FIG. 27)

Text data information TXTDTI comprises the following fields: CHRS, IT_TXT_SRP_Ns, TXTDT_MG_EA.

CHRS (Character Set Code)

Records the character set code used for IT_TXT.

IT_TXT_SRP_Ns (IT_TXT Search Pointer Number)

Records the number of IT_TXT_SRP fields.

TXTDT_MG_EA (Text Data Management End Address)

Records the end address of the TXTDT_MG block.

IT_TXT_SRP (FIG. 27)

The IT_TXT search pointer IT_TXT_SRP records the following information for accessing IT_TXT.

IT_TXT_SA (IT_TXT Start Address)

Records the IT_TXT start address. This address is used to seek and access the IT_TXT block.

IT_TXT_SZ (IT_TXT Size)

Records the IT_TXT data size. A desired IT_TXT block can be read by reading this amount of data.

IT_TXT (FIG. 27)

IT_TXT comprises one or more sets of three fields: identification code IDCD, the text TXT corresponding to that ID code, and an end code TMCD defining the end of the set. If there is no TXT field for an IDCD, the TXT field can be omitted and IDCD and TMCD recorded as one set. Valid IDCD values are defined as follow.

Genre Codes
30h: movie
31h: music
32h: drama
33h: animation
34h: sports
35h: documentary
36h: news
37h: weather
38h: educational
39h: hobby
3Ah: entertainment
3Bh: performing arts (plays, opera)
3Ch: shopping Input source codes
60h: broadcasting station
61h: camcorder
62h: photograph
63h: memo
64h: other

PGCI (FIG. 28)

Original program chain information ORG_PGCI and user-defined program chain information UD_PGCI have a common data structure collectively referred to as program chain information PGCI. PGCI comprises the following fields: PGC_GI (program chain general information), PGI (program information), CI_SRP (cell information search pointer), and CI (cell information).

PGC_GI (FIG. 28)

PGC_GI (PGC general information) comprises the fields PG_Ns (program number) and CI_SRP_Ns (cell information search pointer number) as general information about the PGC. These fields are described further below.

PG_Ns (Program Number)

Records the number of programs in the PGC. If a user-defined PGC, this field is 0 because there is no program.

CI_SRP_Ns (CI_SRP Number)

Records the number of cell information search pointers CI_SRP, described below.

PGI (FIG. 28)

PGI (program information) comprises the following fields as described below: program type PG_TY, cell number C_Ns, primary text information PRM_TXTI, IT_TXT_SRPN, and THM_PTRI.

PG_TY (Program Type)

Records the following information formatted as shown in FIG. 29.

Protect (Protected)
0b: normal
1b: protected

C_Ns (Cell Number)

Records the cell number in the program.

PRM_TXTI (Primary Text Information)

Records the text information describing program content. For further details, see the above-noted PL_SRPT.

IT_TXT_SRPN (IT_TXT_SRP Number)

If IT_TXT containing program content information is recorded in addition to the primary text noted above, the IT_TXT_SRP number recorded in TXTDT_MG is stored to this field.

THM_PTRI (Thumbnail Image Pointer Information)

Records the thumbnail image information representing this program. Details about the THM_PTRI are identical to the above-noted THM_PTRI of PL_SRPT.

CI_SRP (FIG. 28)

The cell information search pointer (CI_SRP) records address information required for accessing this cell information.

CI_SA (Cell Information Start Address)

Records the start address of the cell information. The cell is accessed by seeking this address.

CI (FIG. 30)

CI (cell information) is one of two types: M_CI for movies, or S_CI for still picture.

M_CI (FIG. 30)

M_CI (movie cell information) comprises the following fields: M_C_GI and M_C_EPI.

M_C_GI (FIG. 30)

M_C_GI (movie cell general information) contains the following basic information for each cell.

C_TY (Cell Type)

Figure 31:
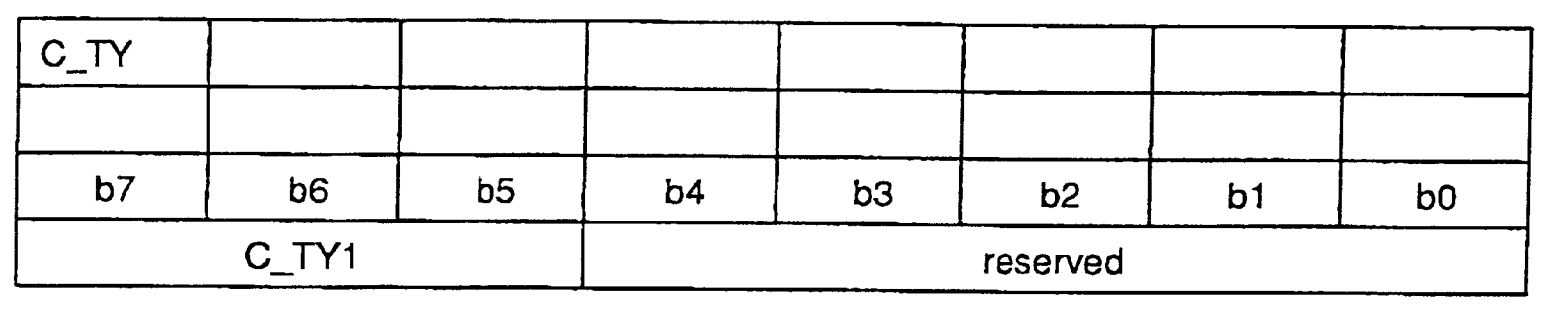

Records the following information formatted as shown in FIG. 31 for identifying movie cells and still picture cells.

C_TY1
000b: movie cell
001b: still picture cell

M_VOBI_SRPN (Movie VOB Information Search Pointer Number)

Records the search pointer number of the movie VOB information corresponding to this cell. To access the stream data corresponding to this cell, it is first necessary to access the movie VOB information search pointer number indicated by this field.

C_EPI_Ns (Cell Entry Point Information Number)

Records the number of entry points in this cell.

C_V_S_PTM (Cell Video Start Time)

Records the playback start time of the cell using the format shown in FIG. 10.

C_V_E_PTM (Cell Video End Time)

Records the playback end time of the cell using the format shown in FIG. 10. Used in conjunction with C_V_S_PTM to define the valid cell period within the corresponding VOB.

M_C_EPI (FIG. 32)

M_C_EPI (movie cell entry point information) is categorized as Type A or Type B based on the presence of primary text.

M_C_EPI (Type A) (FIG. 32)

M_C_EPI (Type A) contains the following information indicative of an entry point.

EP_TY (Entry Point Type)

Figure 33:
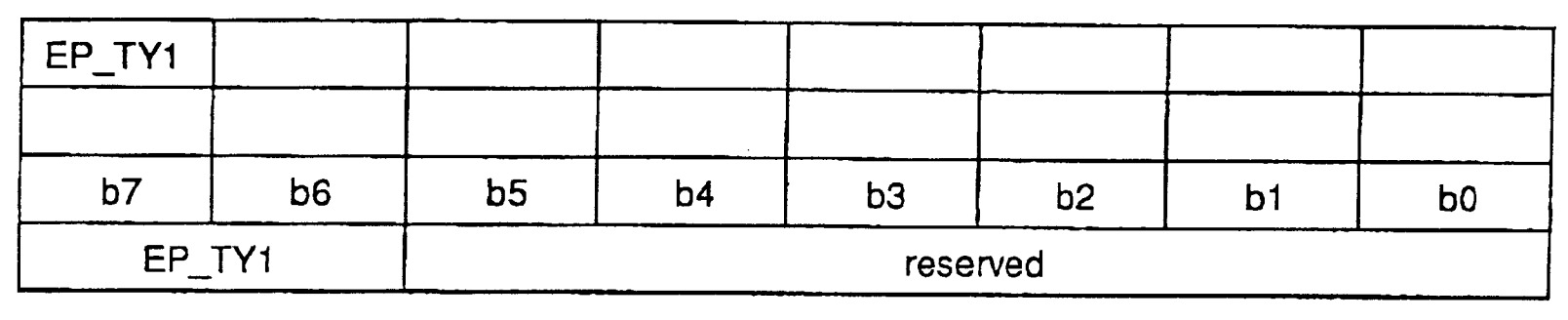

Records the following information formatted as shown in FIG. 33 for identifying the entry point type.

EP_TY1
00b: Type A
01b: Type B

EP_PTM (Entry Point Time)

Records the time at which the entry point is set according to the format as shown in FIG. 10.

M_C_EPI (Type B) (FIG. 32)

In addition to the same EP_TY and EP_PTM fields of Type A, M_C_EPI (Type B) has a PRM_TXTI field as described below.

PRM_TXTI (Primary Text Information)

Records text information describing the content of the location indicated by the entry point. Details of this information are as described in the above-noted PL_SRPT.

S_CI (FIG. 30)

S_CI (still picture cell information) comprises S_C_GI and S_C_EPI fields.

S_C_GI (FIG. 30)

S_C_GI (still picture cell general information) contains the basic cell information described below.

C_TY (Cell Type)

Records information for identifying movie cells and still picture cells. This cell type information is as described above with reference to a movie cell.

S_VOGI_SRPN (Still Picture VOB Group Information Search Pointer Number)

Records the search pointer number of the still picture VOB group information for the cell. To access the stream data corresponding to the cell, it is first necessary to access the still picture VOB group information search pointer number indicated by this field.

C_EPI_Ns (Cell Entry Point Information Number)

Records the number of entry points in this cell.

S_S_VOB_ENTN (Starting Still Picture VOB Number)

Records the still picture VOB number from which cell reproduction starts according to the format as shown in FIG. 11. The still picture VOB number is the sequence number in the S_VOG pointed to by the above-noted S_VOGI_SRPN.

E_S_VOB_ENTN (End Still Picture VOB Number)

Records the still picture VOB number at which cell reproduction ends according to the format as shown in FIG. 11. The still picture VOB number is the sequence number in the S_VOG pointed to by the above-noted S_VOGI_SRPN. It should be noted that the valid cell period in the S_VOG to which the cell belongs is defined by this field in conjunction with S_S_VOB_ENTN.

S_C_EPI (FIG. 32)

S_C_EPI (still picture cell entry point information) is categorized as Type A or Type B depending upon the presence of primary text.

S_C_EPI (Type A) (FIG. 32)

S_C_EPI (Type A) contains the following information indicative of an entry point.

EP_TY (Entry Point Type)

Records the following information formatted as shown in FIG. 33 for identifying the entry point type.

EP_TY1

00b: Type A

01b: Type B

S_VOB_ENTN (Still Picture VOB Entry Number)

Records the still picture number in which the entry point is set according to the format as shown in FIG. 11.

S_C_EPI (Type B) (FIG. 32)

In addition to the same EP_TY and S_VOB_ENTN fields of Type A, S_C_EPI (Type B) has a PRM_TXTI as described below.

PRM_TXTI (Primary Text Information)

Records text information describing the content of the location indicated by the entry point. Details of this information are as described in the above-noted PL_SRPT.

Configuration of a DVD Recorder

The configuration of a DVD recorder is described next below with reference to FIG. 40.

As shown in the figure, this DVD recorder comprises a user interface 7801 for interaction with the user; a system controller 7802 for handling overall management and control of the recorder; an input block 7803 comprising an A/D converter for audio and video input to the recorder; an encoder 7804; an output section 7805 for audio and video output; a decoder 7806 for MPEG stream decoding; track buffer 7807; and drive 7808.

Operation of a DVD Recorder

Figure 40:
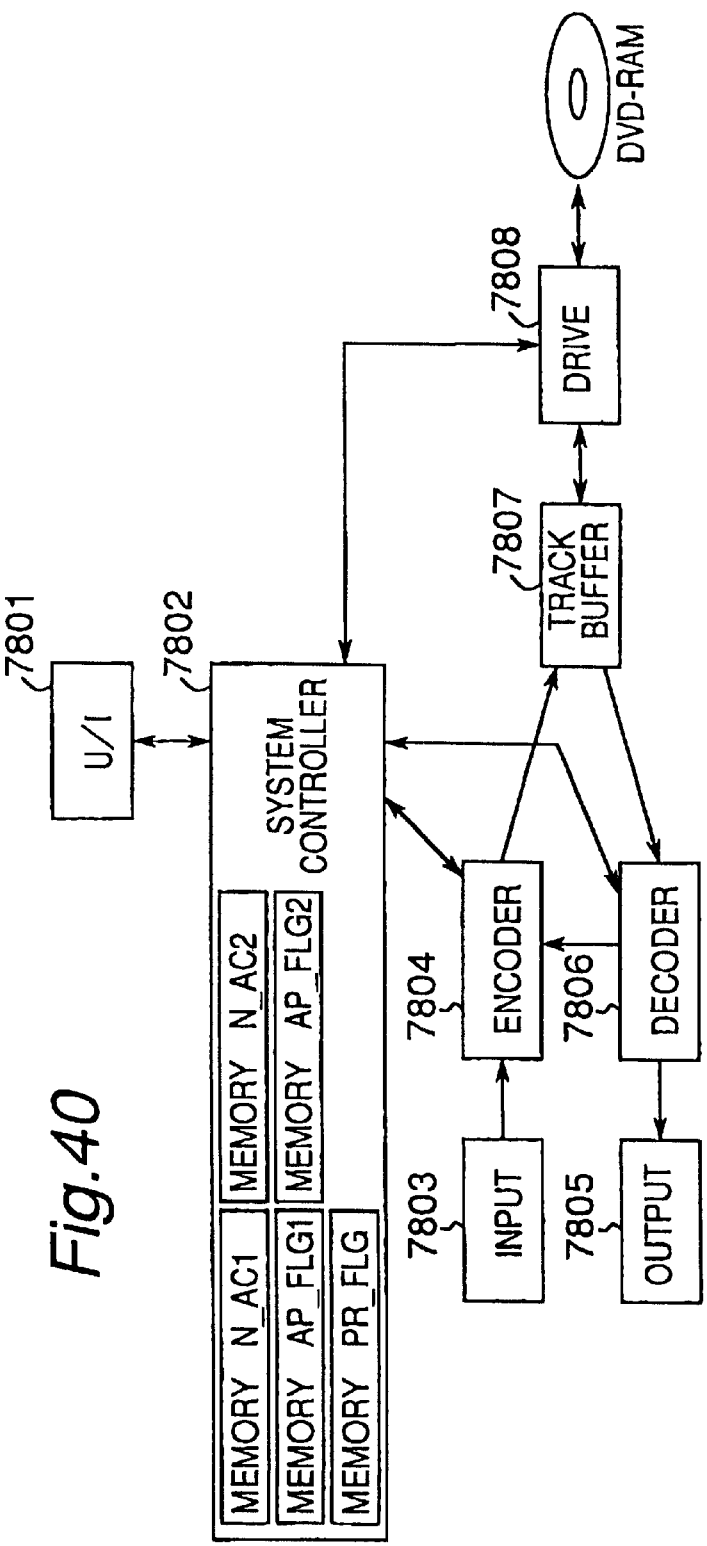
FIG. 40 is a block diagram of a DVD recorder.

The basic recording and reproduction operation of a DVD recorder shown in FIG. 40 is described next below.

A play list recording operation is described first below.

Before recording starts, the input block 7803, encoder 7804, and track buffer 7807 are initialized by a command from the system controller 7802. Audio and video data input to the input block 7803 are A/D converted and passed to the encoder 7804. The encoder 7804 compresses and multiplexes the video and audio data to generate an MPEG system stream, which it then passes to the track buffer 7807. Data is then passed sequentially from the track buffer 7807 to the drive for recording to DVD-RAM disc.

A method for defining a play list is described briefly next.

The new stream recorded by the above operation is appended to the end of the original program chain ORG_PGC in which all streams on the disc are stored. Playback is possible by means of this original program chain ORG_PGC alone, but a wider range of reproduction paths can be achieved by defining a user-defined PGC, that is, a play list, whereby desired parts of the original program chain ORG_PGC are selectively retrieved and reproduced. A play list makes it possible to select only desired parts of the original program chain ORG_PGC for reproduction in a desired sequence. Therefore, the operation for defining a play list with respect to operations involving the user interface basically requires the user to define a desired number of pairs of starting points A and ending points B in the original program chain ORG_PGC.

If these starting points A and ending points B indicate moving picture or audio data, points A and B are defined using the time stamp on the stream; if still pictures, points A and B define the first and last still picture numbers, respectively.

It should be noted that this play list defining process can be accomplished by means of the system controller 7802 operating in conjunction with user interface 7801 shown in FIG. 40.

Moving picture data (M_VOBI #1, M_VOB #1) or still picture data (S_VOGI #1, S_VOB #1, . . . S_VOB #i) must be present as shown in FIG. 4 together with the original program chain ORG_PGC (the block indicated as a Program Set in FIG. 4) to record a play list. When a new play list is generated, Play List #i as shown at the top right in FIG. 4 is compiled and recorded to the management information.

Play List #1, which is compiled first, is described below.

The user first selects image #p to #q from among the still pictures in S_VOGI #1. The selection information for images #p to #q is stored in the first cell S_Cell in Play List #1. More specifically, information indicative of S_VOGI #1 is written to the still picture VOB group information search pointer number S_VOGI_SRPN shown in the bottom right of FIG. 30; the p-th image number is written to S_S_VOB_ENTN, and the q-th image number is written to E_S_VOB_ENTN.

In the case of a video selection, the user selects a moving picture sequence in M_VOBI #1 starting at time m from a reference time (a time determined by the time stamping) and ending at time n from the reference time. Data indicating this selection from time m to time n is stored to the second cell M_Cell in the Play List #1. More specifically, information indicative of M_VOBI #1 is written to movie VOB information search pointer number M_VOBI_SRPN, time m is written to C_V_S_PTM, and time n is written to C_V_E_PTM, as shown in the top right of FIG. 30.

When a Play List #1 thus recorded is reproduced, still pictures #p to #q are first reproduced from S_VOGI #1, and video from is then reproduced from time m to time n from M_VOBI #1. As a result, a particular AV sequence desired by the user can be reproduced in the desired order.

The play list recording operation described above is described in further detail below with reference to the flow charts in FIG. 43 and FIG. 44.

The steps shown in FIG. 43 are described first.

Step #1: The cell information number N is set to 1. This cell information CI number is shown as CI #n in the bottom left of FIG. 30, and corresponds to either video cell information or still picture cell information.

Step #2: It is determined whether the user-selected data is moving picture or still picture data. If video data, the procedure steps to step #3; if still picture data, the procedure steps to step #7.

Step #3: The selected M_VOBI #i is read. A movie VOB information search pointer number M_VOBI_SRPN for specifying M_VOBI #i is generated, and stored to M_VOBI_SRPN memory (FIG. 40).

Step #4: While playing the video corresponding to M_VOBI #i, the user asserts a cue signal at the desired place in the video, that is, at the beginning point of the user-defined play list. C_V_S_PTM storing a start time as detected from the time stamp is then generated, and stored to C_V_S_PTM memory (FIG. 40). The user then asserts a cue signal again at the end of the desired segment. C_V_E_PTM defining the end time is similarly generated, and stored to C_V_E_PTM memory (FIG. 40).

Figure 30:
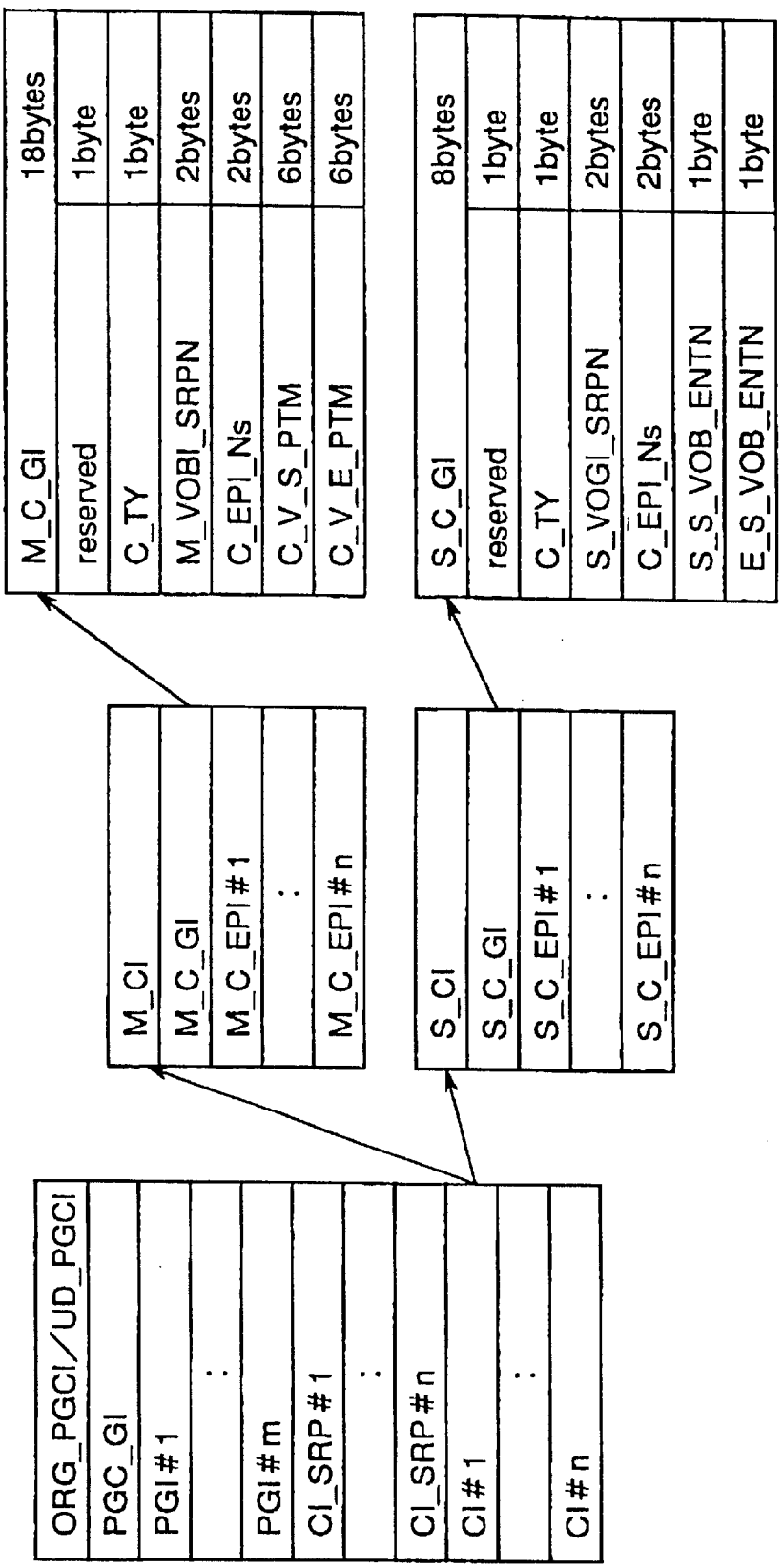
FIG. 30 shows the structure of the CI block.
Figure 35A:
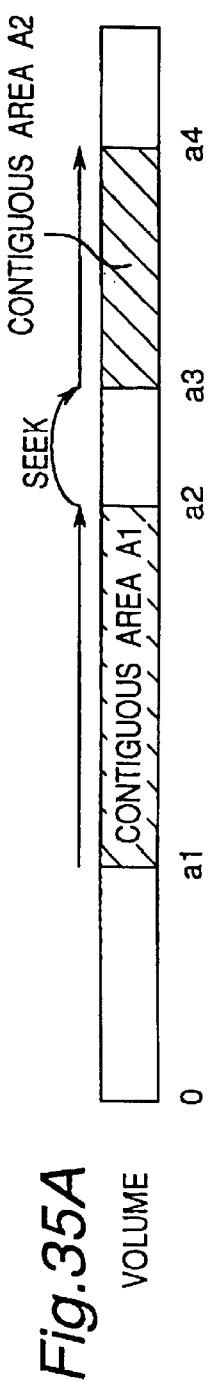
FIG. 35($a$) shows the volume address space of a disc, and ($b$) shows the change in data accumulation in the track buffer.
Figure 35B:
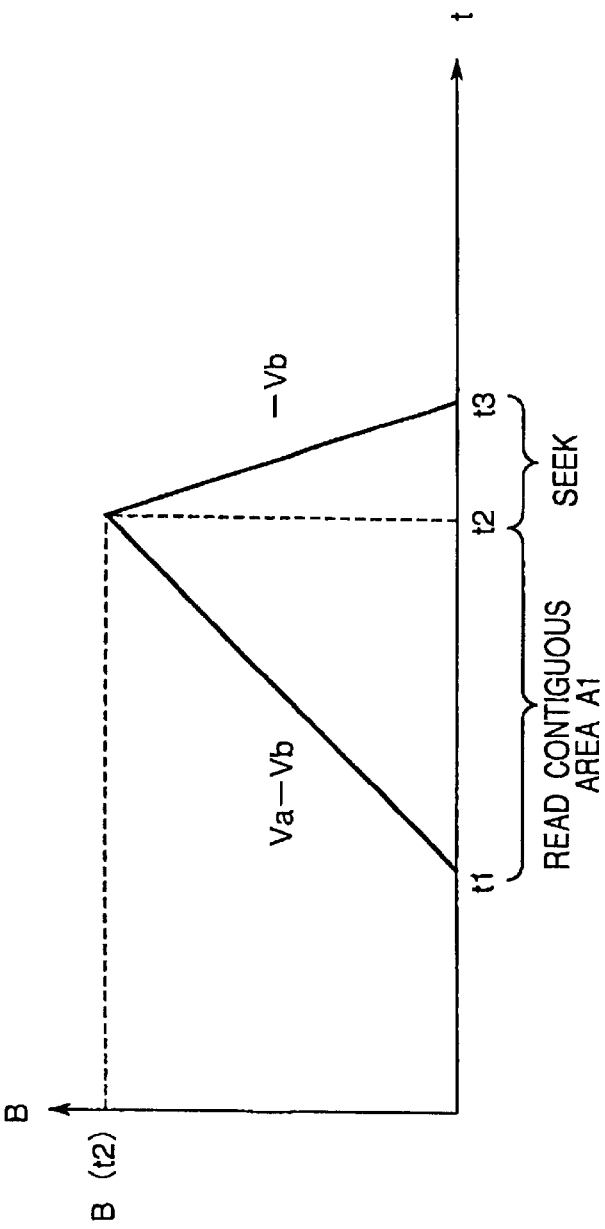
Figure 36:
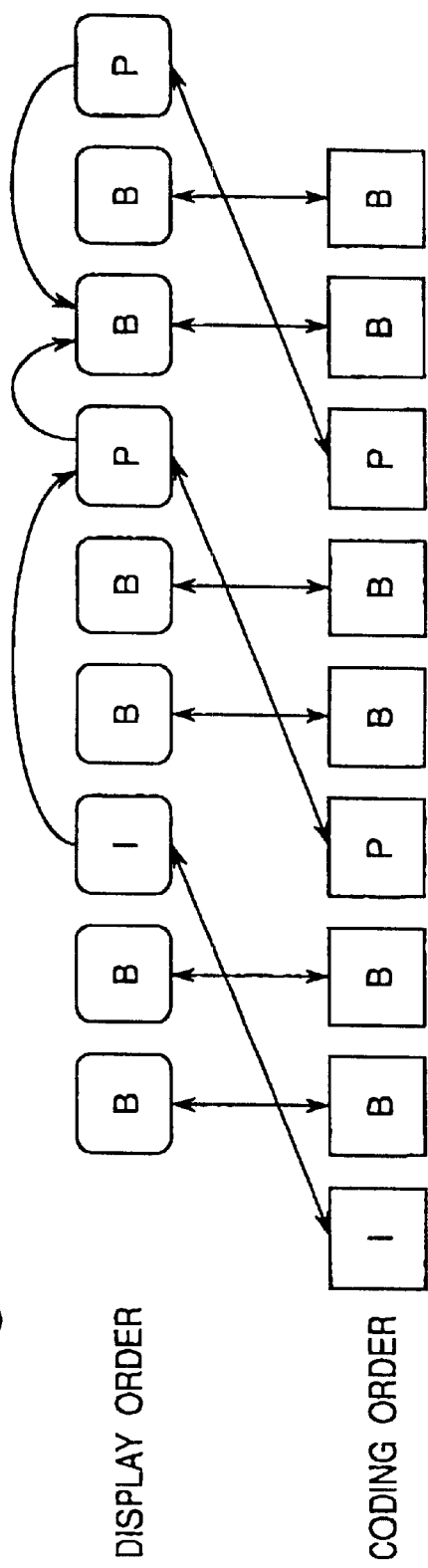
FIG. 36 shows the correlation between picture types in an MPEG video system stream.
Figure 37:
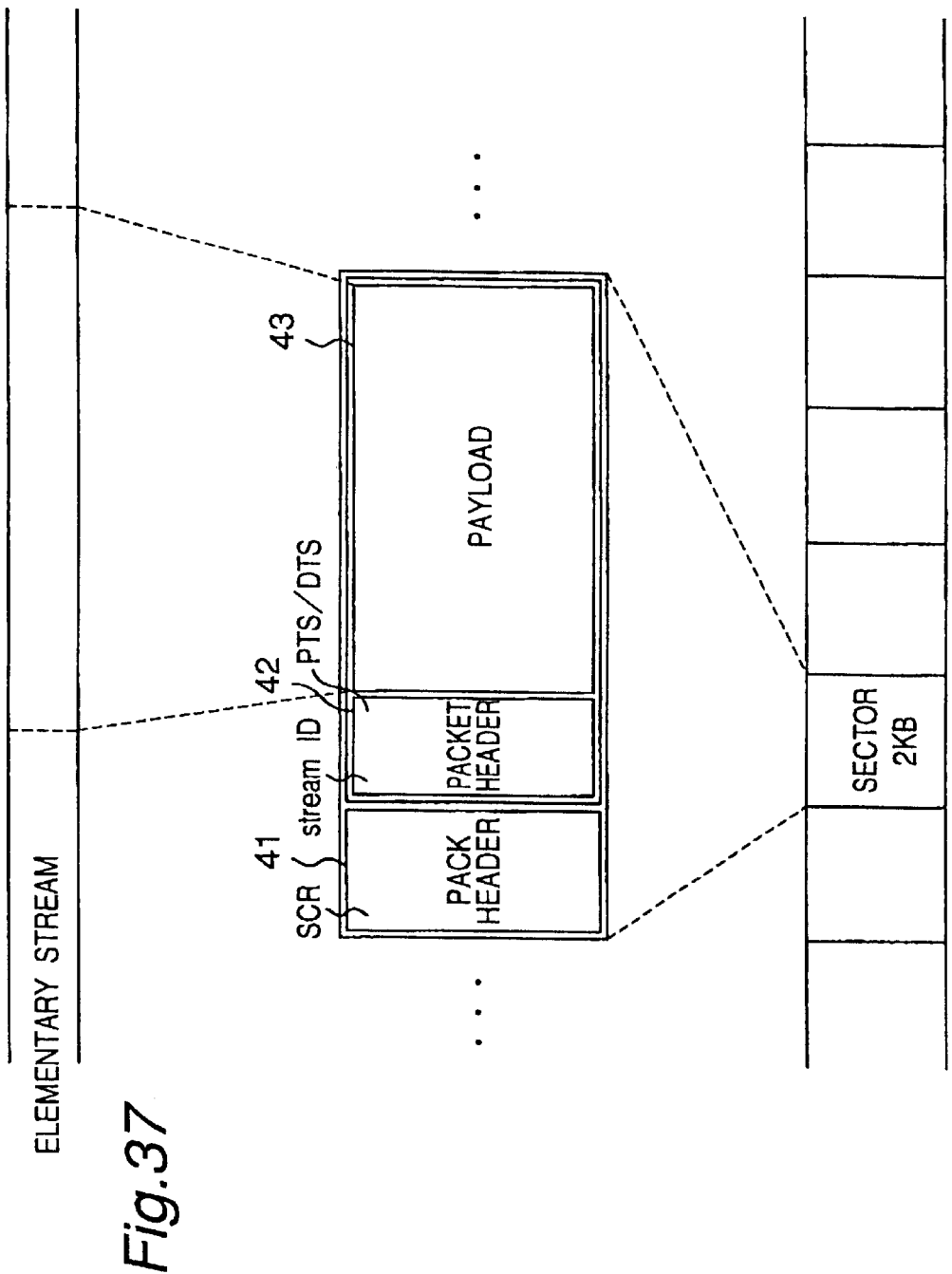
FIG. 37 shows the structure of an MPEG system stream.
Figure 38:
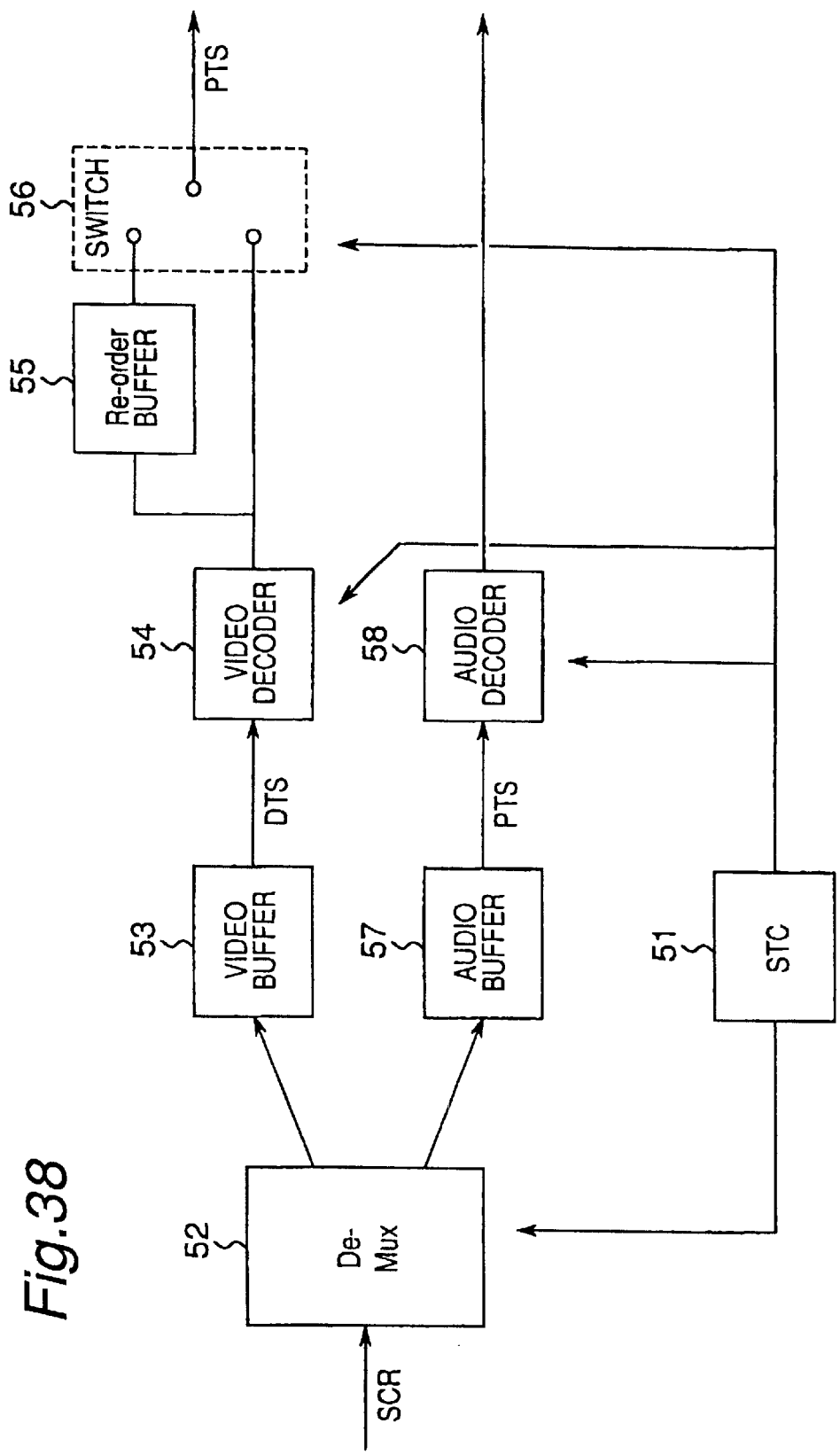
FIG. 38 is a block diagram of an MPEG system decoder (P_STD)
Figure 39:
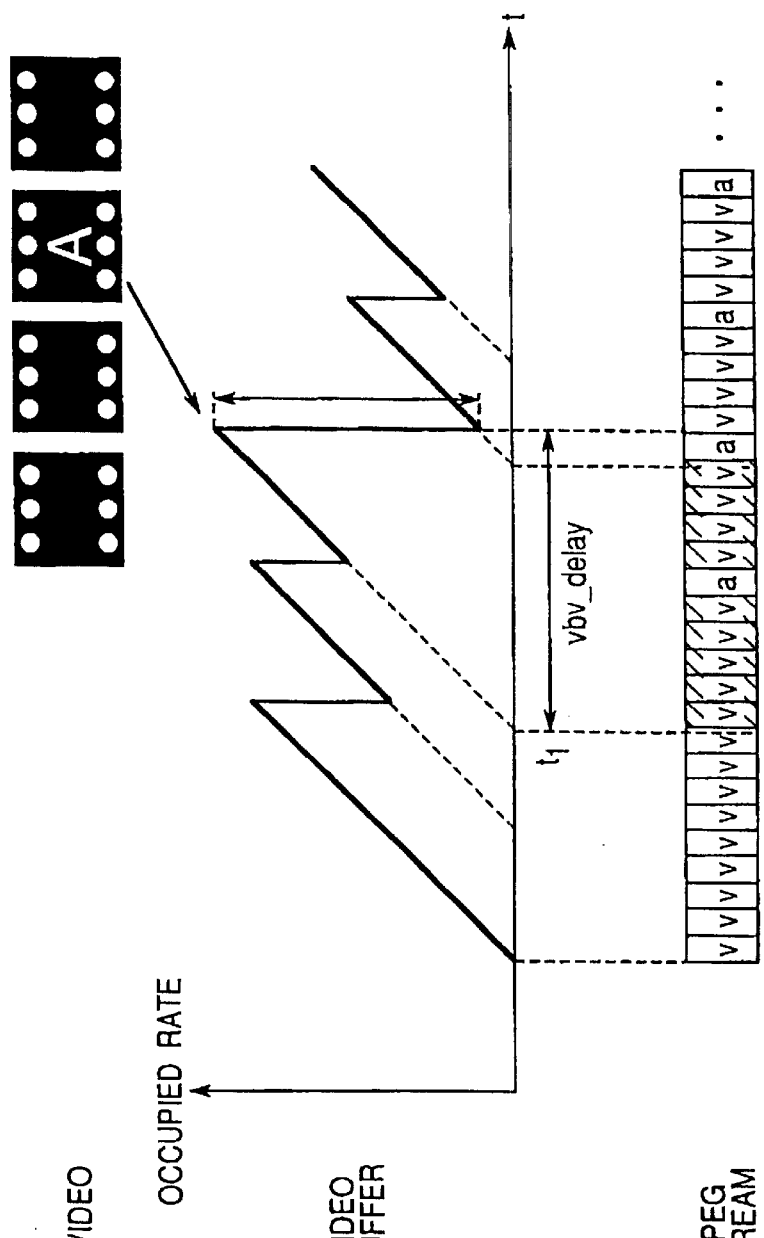
FIG. 39($a$) shows video data, ($b$) shows the change in data accumulation in the video buffer, ($c$) shows the MPEG system stream, and ($d$) shows the audio data.

Step #5: Data required for the cell information shown in FIG. 30 is then generated and stored to memory (not shown in FIG. 40).

Figure 23:
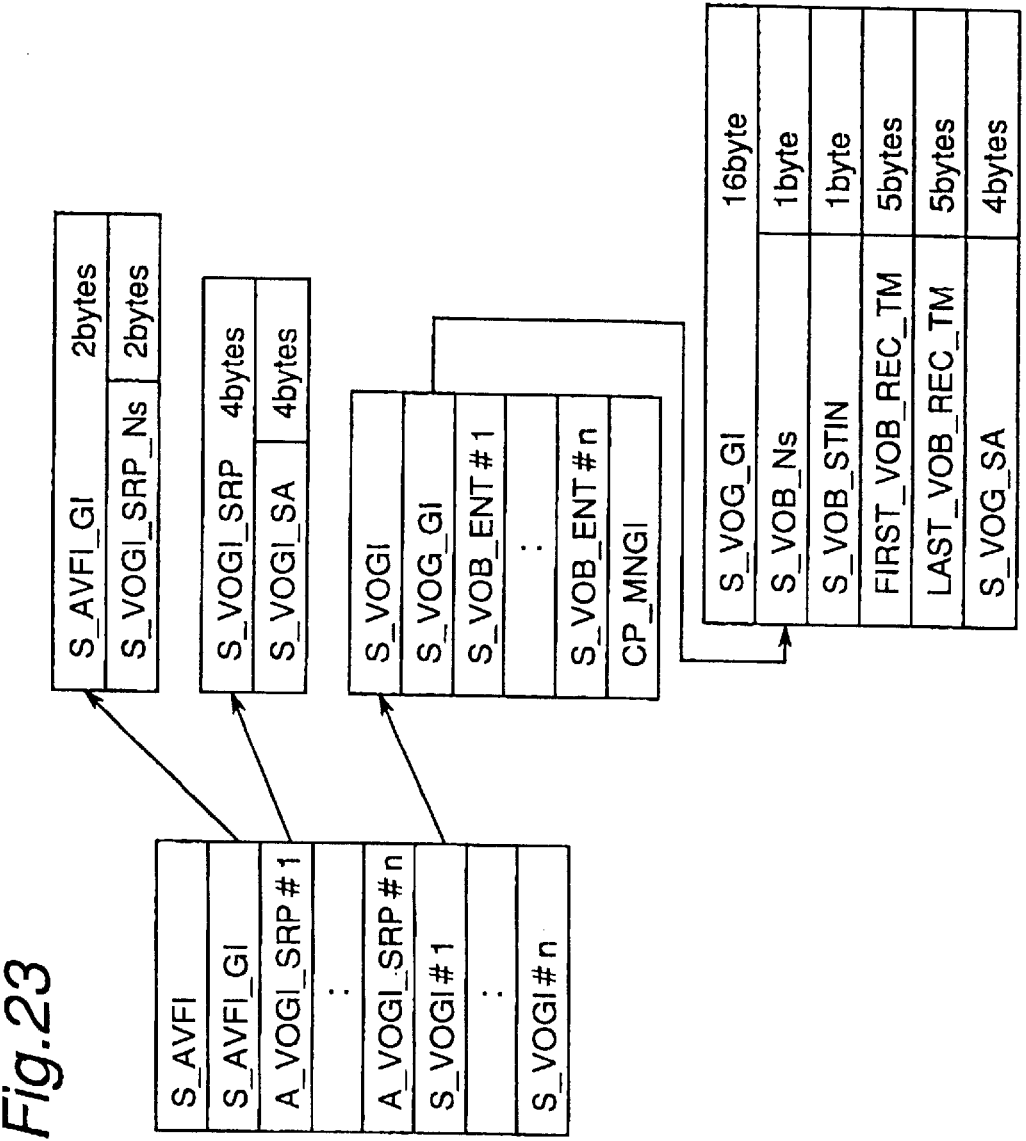
FIG. 23 shows the structure of the S_AVFI block.
Figure 26:
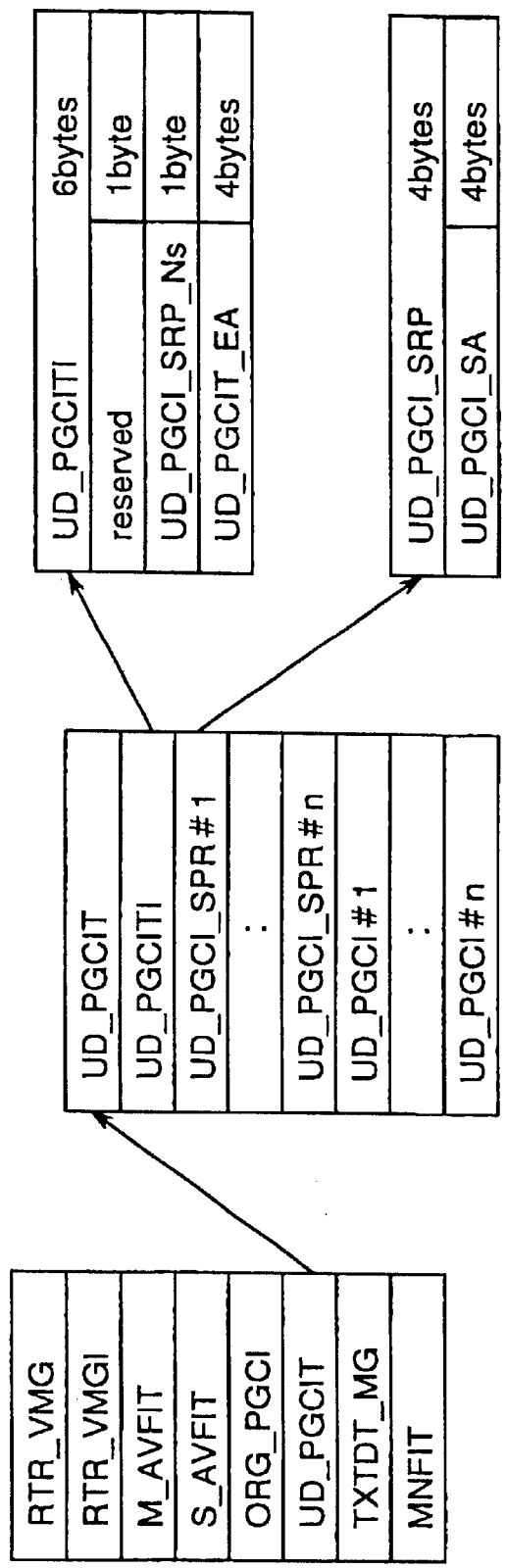
FIG. 26 shows the structure of the UD_PGCIT block.
Figure 27:
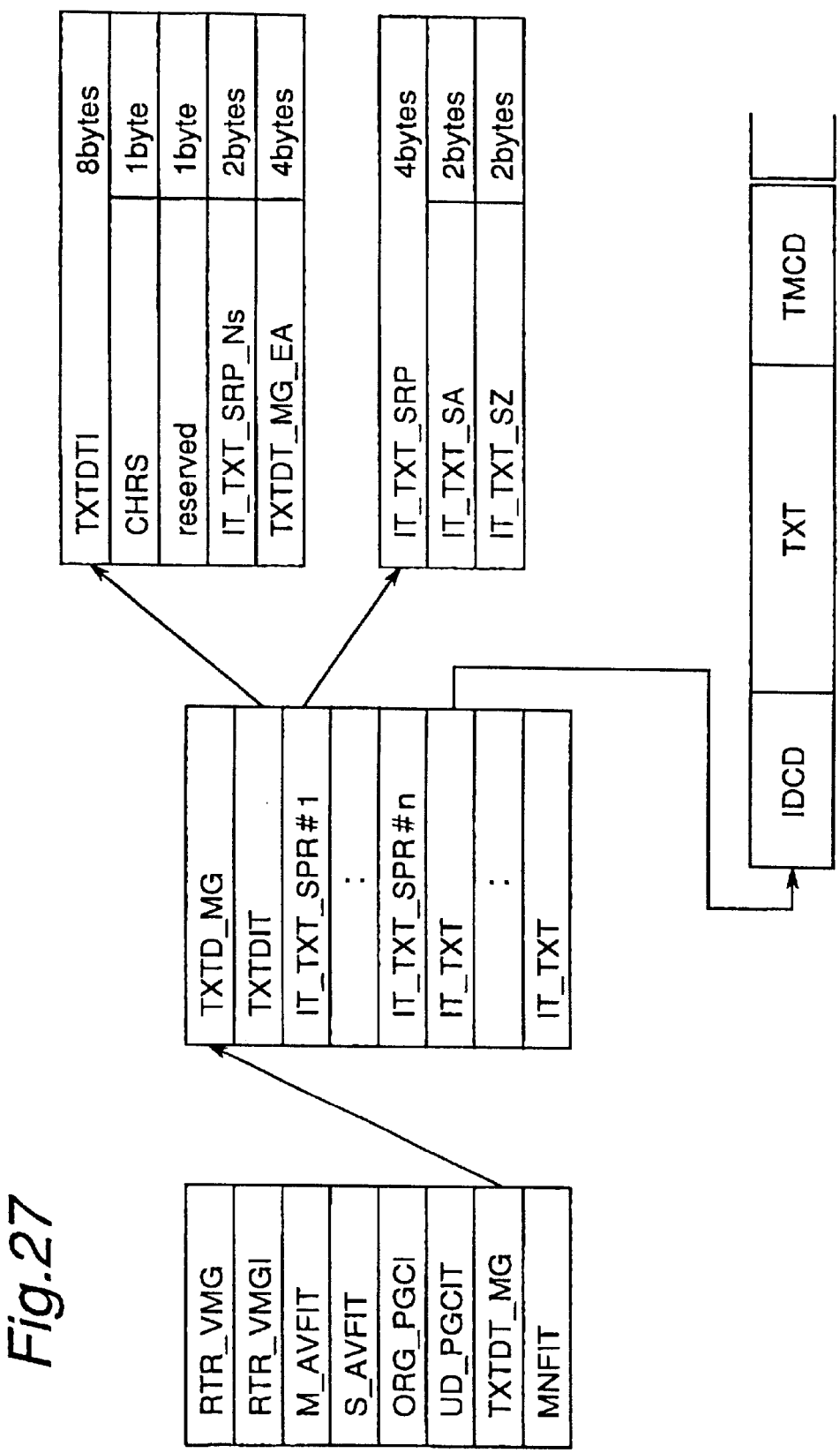
FIG. 27 shows the structure of the TXTDT_MG block.
Figure 28:
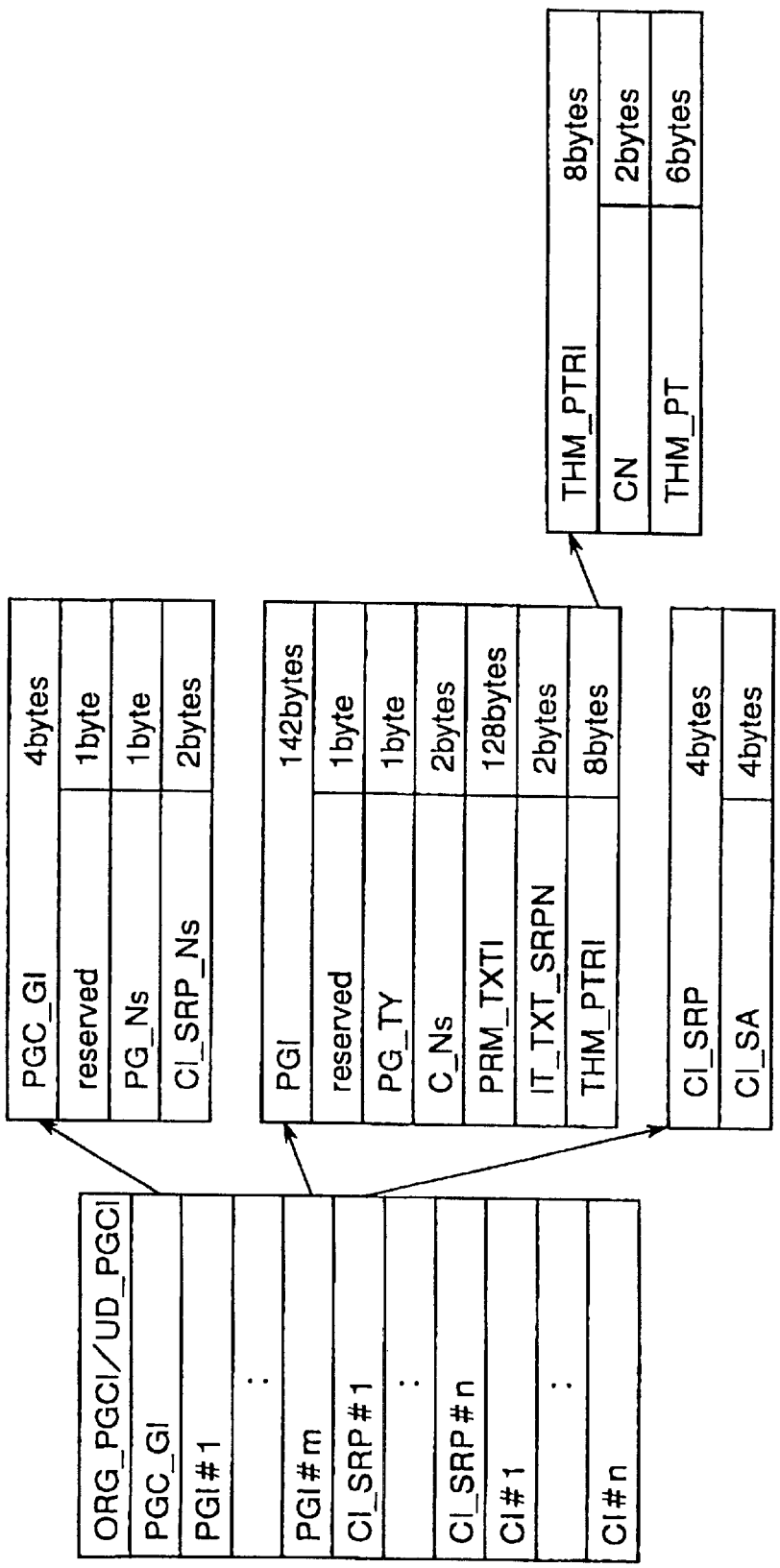
FIG. 28 shows the structure of the PGCI block.

Step #6: The selected still picture information S_VOGI #i is read. As shown in FIG. 23, S_VOGI #i contains a plurality of still pictures; a particular still picture in this still picture group is identified by S_VOB_Ns. The still picture VOB group information search pointer number S_VOGI_SRPN identifying this S_VOGI #i is generated, and stored to S_VOGI_SRPN memory (FIG. 40).

Step #7: The user asserts a cue signal when the desired still picture is displayed while the still pictures in S_VOGI #i are being reproduced in sequence. S_S_VOB_ENTN storing the number of the still picture in the sequence is generated, and stored to S_S_VOB_ENTN memory (FIG. 40). The user then asserts a cue signal when the desired last still picture is being displayed. E_S_VOB_ENTN storing the number of this still picture is similarly generated and stored to E_S_VOB_ENTN memory (FIG. 40).

Step #8: Data required for the still picture cell information shown in FIG. 30 is generated, and stored to memory (not shown in FIG. 40).

Step #9: Cell information for one cell is thus completed and stored to memory.

Step #10: The user decides whether to select additional video or still pictures. To select additional images, the user returns to step 2, otherwise the procedure steps to step #11.

Step #11: Play List #i, that is, the user-defined program chain information UD_PGCI, is completed, and written to disc as part of the management information by way of drive 7808.

Step #12: Play list type information PL_TY describing the content of the play list completed in step #11 is generated, that is, whether video and/or still pictures are present, and written to disc by way of drive 7808 as part of the management information. Details about generating this play list type information PL_TY are further described in detail with reference to FIG. 44.

Step #13: Play list search pointer table PL_SRPT pointing to the the play list to which play list type PL_TY corresponds is generated, and written to disc as part of the management information by way of drive 7808.

The steps in the procedure shown in FIG. 44 are described next below.

Step #20: It is detected whether video cells are contained in Play List #i, that is, the compiled user-defined program chain information UD_PGCI.

Step #21: It is detected whether still picture cells are contained in Play List #i, that is, the compiled user-defined program chain information UD_PGCI.

Step #22: It is detected whether still picture cells are contained in Play List #i, that is, the compiled user-defined program chain information UD_PGCI.

Step #23: If both video and still pictures are contained in the play list, play list type PL_TY is set to 0010b.

Step #24: If only video is contained in the play list, play list type PL_TY is set to 0000b.

Step #25: If only still pictures are contained in the play list, play list type PL_TY is set to 0001b.

Step #26: If no video or still pictures are contained in the play list, that is, only audio data is present, play list type PL_TY is set to 0011b.

Figure 41:
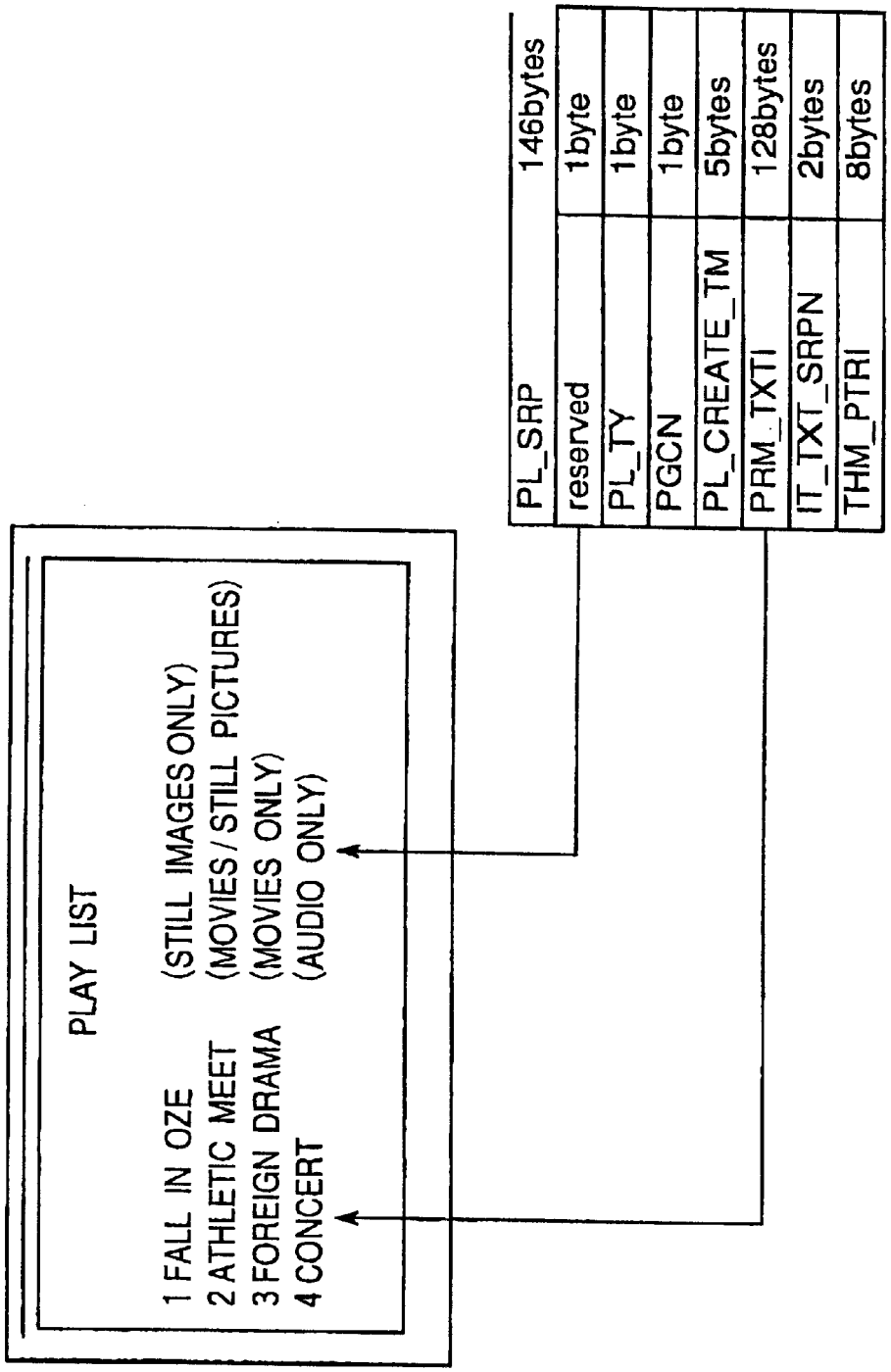
FIG. 41 is used to describe to first exemplary play list presentation and selection screen.

The play list type PL_TY thus defined is written to the play list search pointer PL_SRP shown at the bottom right in FIG. 41. By reproducing this play list search pointer PL_SRP, the display as shown at the top left in FIG. 41 is presented.

Reproducing the play list is described next.

The user inserts a DVD-RAM disc to the player and selects a desired reproduction path from among the plural reproduction paths on disc. A method whereby the user selects the desired reproduction path is described in detail below.

Reproduction paths are defined by means of the user-defined program chain information UD_PGCI, or play list, as noted above. A plurality of play lists can be defined, and it is therefore essential to present a list of available play lists, i.e., program chains, in a way that is easy for the user to understand the content of each play list.

A presentation screen using this play list search pointer PL_SRP is described next with reference to the flow chart in FIG. 45.

The steps in FIG. 45 are described next below.

Figure 8:
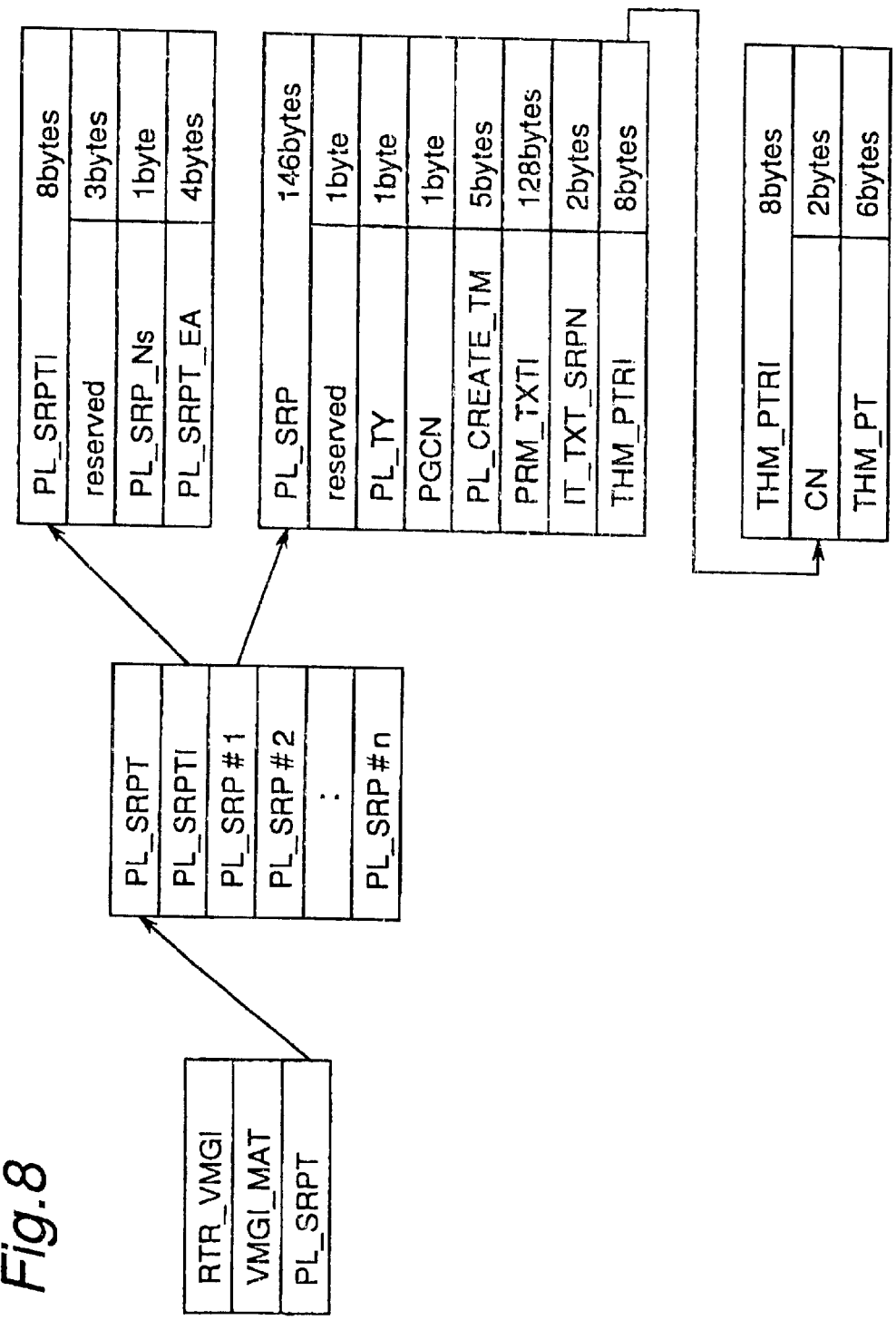
FIG. 8 shows the structure of the PL_SRP block.
Figure 12:
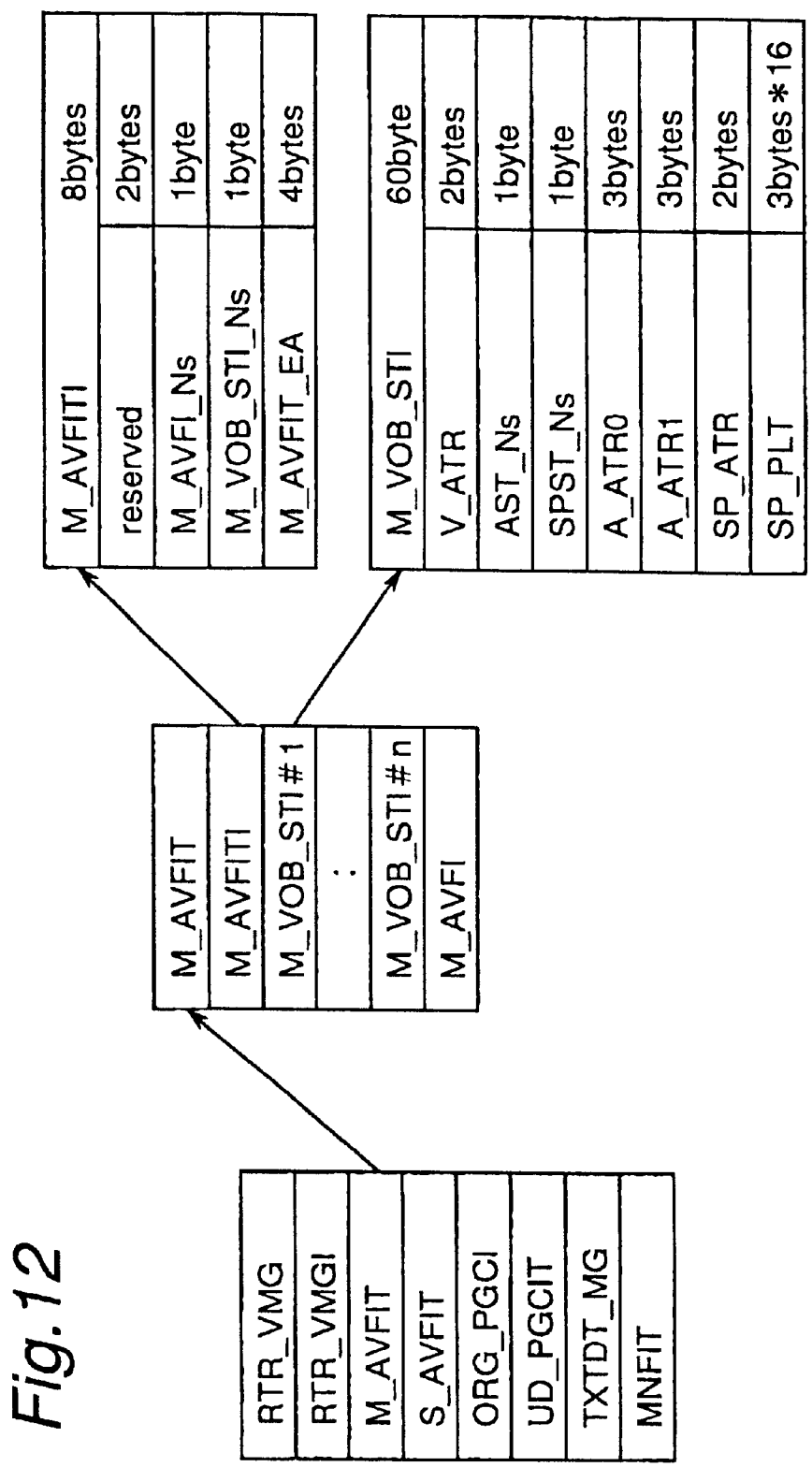
FIG. 12 shows the structure of the M_AVFIT block.

Step #30: The play list number N is set to 0. The play list number is shown by PL_SRP #n as shown in the middle of FIG. 8.

Step #31: Play list number N is incremented 1.

Step #32: The N-th play list search pointer PL_SRP is read from the play list search pointer table PL_SRPT. The content of play list search pointer PL_SRP is shown in the middle of FIG. 8 and on the right in FIG. 41.

Step #33: Primary text information PRM_TXTI and play list type PL_TY are read from play list search pointer PL_SRP. The titles contained in the play list are recorded in primary text information PRM_TXTI.

Step #34: Whether there is a next play list is detected. If there is, the procedure loops back to step #31; if not, the procedure steps to step #35.

Step #35: A list of available play lists is presented on screen. An exemplary presentation screen is shown in FIG. 41. In the example shown in FIG. 41, play list 1 contains only a still picture of "Fall in Oze"; play list 2 comprises a mix of video and still pictures from the "School Field Day"; play list 3 comprises only video from an "Overseas Drama"; and play list 4 comprises only the audio from a "Concert."

Step #36: The user selects a play list for playback. In the example shown in FIG. 41, the user can select from play lists 1 to 4.

Step #37: The selected play list is reproduced.

The content of a play list presentation screen is described further below with reference to FIG. 41.

The numbers 1, 2, 3, 4 on the left side of the display are sequential play list numbers. Play list titles are shown in the middle column, such as "Fall in Oze" and "Concert". This information is stored to the PRM_TXTI field of the play list search pointer PL_SRP in the play list search pointer table PL_SRPT written to the optical disc.

The third column (including still pictures only and video only) shows the type of AV data in the corresponding play list, and is stored to the PL_TY field of the play list search pointer PL_SRP. This information tells the user the configuration of each play list, and gives the user a basic idea of what type of content will be presented if that play list is selected and reproduced. For example, if the audio-only concert is selected, the user will know before playback starts that only audio will be reproduced and there will be no video accompaniment. If the still picture program "Fall in Oze" is selected, the user will likewise know that still pictures will be displayed, and that either the next image will be displayed automatically after a period of time, or that some type of manual operation will be required to advance as desired to the next still picture.

By thus presenting the PL_TY information to the user when the user is selecting the play list to be reproduced, the user can get basic information about the configuration of different types of play lists before making a selection so that user confusion can be avoided when actual playback begins.

Figure 42:
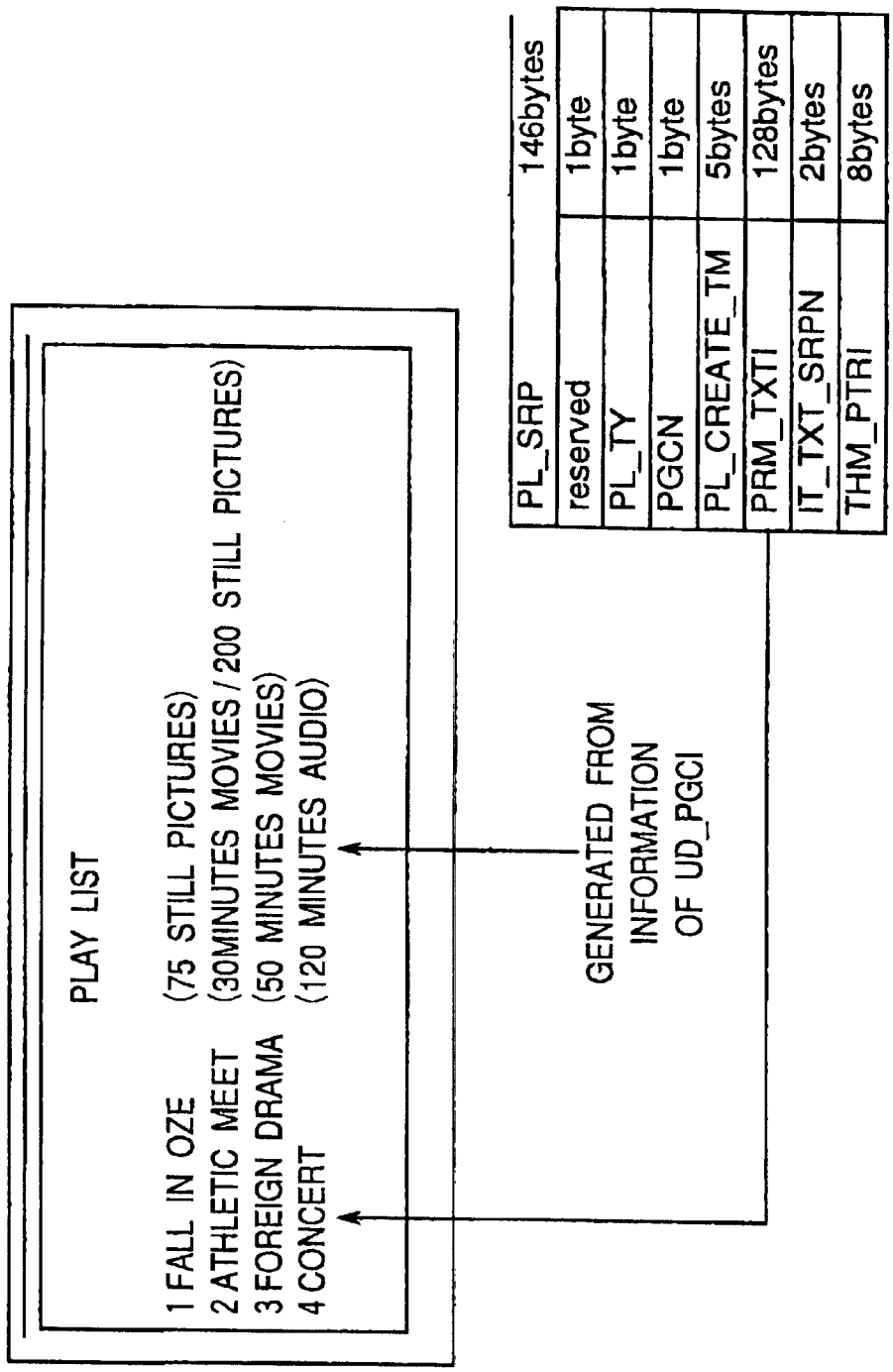
FIG. 42 is used to describe to second exemplary play list presentation and selection screen.

Another exemplary play list presentation screen is shown in FIG. 42. This screen shows an even more detailed explanation of the play list configuration in the third column from the left. For example, this screen tells the user that the "Fall in Oze" play list comprises 75 still pictures. It should be noted that in this case, however, this presentation screen cannot be generated from the play list search pointer PL_SRP information alone, and the user-defined program chain information UD_PGCI must also be read. More specifically, S_S_VOB_ENTN and E_S_VOB_ENTN must be read to detect the number of still pictures in the play list (see FIG. 30, bottom right). To detect the video playback time, C_V_S_PTM and C_V_S_PTM (see FIG. 30, top right) must be read. Reading this information can be time-consuming, and is therefore not practical when the number of play lists is large. It is, therefore, more practical to only display this information when the user requests the information be shown.

The playback operation performed after the user selects the program to be reproduced is described next below.

The track buffer 7807, decoder 7806, and output section 7805 are initialized by a command from the system controller 7802. The system controller 7802 then instructs the disc drive to seek the start address of the AV data in the first VOB of the selected program. The drive then begins reading the data and passes the read AV data to the track buffer 7807. The decoder 7806 reads data from the track buffer 7807, extracts the decompressed AV data by applying an MPEG decoding operation, and passes the decompressed AV data to the output section 7805. The output section 7805 D/A converts the data and outputs the resulting analog AV data to the television or other AV device connected to the output terminal.

Operations relevant to the type of play list being reproduced, that is, the PL_TY value, can be performed while playback is in progress. For example, searches using a time value can be performed when a video stream is being played, enabling the user to advance 30 ahead or rewind 2 minutes, for example. When playing a still picture stream, operations for skipping to the twentieth image or back three images can be performed.

The system controller 7802 thus stores the PL_TY value for the play list currently being played in memory, and enables requests received from the user interface 7801 that are meaningful for that type to be acted on. A disc player of this type can thus prevent meaningless operations, and maintain system operation that is matched to the disc content, by changing its response to user operations when playback is in progress or is interrupted based on the PL_TY value of the play list currently being reproduced.

It should be noted that this embodiment of our invention has been described with reference to four playback possibilites, video only, still pictures only, video and still pictures mixed together, and audio only with no video or still pictures, but the invention shall not be limited thereto. For example, presentation is also possible using only three types: video only, still pictures only, and video and still pictures mixed together.

It should be noted that the preferred embodiment of the invention is described above with reference to a DVD-RAM disc, but it will be obvious to one with ordinary skill in the related art that any rewritable optical disc can be alternatively used.

Furthermore, this embodiment of the invention has been described using four play list types (PL_TY), video only, still pictures only, video and still pictures mixed together, and audio only with no video or still pictures, but other types can be added. For example, still pictures with and without audio, public doman content with no copyright restrictions, and copyrighted content with some restrictions applied.

Furthermore, the DVD recorder is described as having recording, playback, play list definition and editing functions in a single unit, but the effect of the invention will be the same even if a dedicated recorder, dedicated player, and dedicated editor are used to perform respective operations.

The invention has also been described with operation of the disc player changing according to the PL_TY value, but restrictions can also be placed on editor operations. For example, if a reproduction path is restricted by a third-party copyright or the AV data is restricted from being edited, this information can be passed to the editor to prohibit certain editing operations according to the PL_TY value.

Benefits of the Invention

By recording information indicating the type of each of plural reproduction paths recorded to an optical disc, meaningful information enabling the user to select a desired play list for reproduction can be presented to the user, thereby avoiding user confusion and making the optical disc and disc player easier to operate and use.

In addition, the disc player can provide to the user a response appropriate to the type of reproduction path selected when a user command is received by way of the user interface when playback is interrupted or in progress.

What is claimed is:

1. An optical disc comprising: an area for recording a video object including at least one of a moving picture video object (M_VOB) and a still picture video object (S_VOB); and a management information recording area for storing management information, wherein:
   the management information comprises reproduction path information (UD_PGCI) containing at least one of first information and second information, and type information (PL_TY) indicating a type of a reproduction path corresponding (PGCN) to said reproduction path information,
   said first information containing information (M_VOBI_SRPN) specifying a moving picture video object, cell video starting time information (C_V_S_PTM), and cell video ending time information (C_V_E_PTM) indicating a particular section in the specified moving picture video object,
   said second information containing information (S_VOGI_SRPN) specifying a still picture video object group containing at least one still picture video object, starting entry number information (S_S_VOB_ENTN), and ending entry number information (E_S_VOB_ENTN) indicating a particular section in the specified still picture video object group, and
   said type information containing information indicative of any one of whether content contained in the reproduction path specified by the reproduction path information (UD_PGCI)
   (a) contains moving pictures and no still pictures,
   (b) contains still pictures and no moving pictures, and
   (c) contains a mixture of moving pictures and still pictures.

2. A recording method for recording an optical disc having an area for recording a video object including at least one of a moving picture video object (M_VOB) and a still picture video object (S_VOB), and a management information recording area for storing management information, the recording method comprising:
   producing reproduction path information (UD_PGCI) containing at least one of first information and second information;
   producing type information (PL_TY) indicating a type of a reproduction path corresponding (PGCN) to said reproduction path information; and
   recording the reproduction path information and type information to the management information recording area;
   said first information containing information (M_VOBI_SRPN) specifying a moving picture video object, cell video starting time information (C_V_S_PTM), and cell video ending time information (C_V_E_PTM) indicating a particular section in the specified moving picture video object, said second information containing information (S_VOGI_SRPN) specifying a still picture video object group containing at least one still picture video object, starting entry number information (S_S_VOB_ENTN), and ending entry number information (E_S_VOB_ENTN) indicating a particular section in the specified still picture video object group, and said type information containing information indicative of any one of whether content contained in the reproduction path specified by the reproduction path information (UD_PGCI)
(a) contains moving pictures and no still pictures,
(b) contains still pictures and no moving pictures, and
(c) contains a mixture of moving pictures and still pictures.

3. A recording device for recording an optical disc having an area for recording a video object including at least one of a moving picture video object (M_VOB) and a still picture video object (S_VOB), and a management information recording area for storing management information, the recording device comprising:

an arrangement which produces reproduction path information (UD_PGCI) containing at least one of first information and second information;

an arrangement which produces type information (PL_TY) indicating a type of a reproduction path corresponding (PGCN) to said reproduction path information; and an arrangement which records the reproduction path information and type information to the management information recording area;

said first information containing information (M_VOBI_SRPN) specifying a moving picture video object, cell video starting time information (C_V_S_PTM), and cell video ending time information (C_V_E_PTM) indicating a particular section in the specified moving picture video object, said second information containing information (S_VOGI_SRPN) specifying a still picture video object group containing at least one still picture video object, starting entry number information (S_S_VOB_ENTN), and ending entry number information (E_S_VOB_ENTN) indicating a particular section in the specified still picture video object group, and said type information containing information indicative of any one of whether content contained in the reproduction path specified by the reproduction path information (UD_PGCI)
(a) contains moving pictures and no still pictures,
(b) contains still pictures and no moving pictures, and
(c) contains a mixture of moving pictures and still pictures.

4. A reproducing method for reproducing an optical disc having an area for recording a video object including at least one of a moving picture video object (M_VOB) and a still picture video object (S_VOB), and a management information recording area for storing management information, the reproducing method comprising:

reproducing reproduction path information from the management information recording area;

extracting from said reproduction path information, at least one of first information and second information; and reproducing from the management information, type information (PL_TY) indicating a type of a reproduction path corresponding (PGCN) to said reproduction path information;

said first information containing information (M_VOBI_SRPN) specifying a moving picture video object, cell video starting time information (C_V_S_PTM), and cell video ending time information (C_V_E_PTM) indicating a particular section in the specified moving picture video object, said second information containing information (S_VOGI_SRPN) specifying a still picture video object group containing at least one still picture video object, starting entry number information (S_S_VOB_ENTN), and ending entry number information (E_S_VOB_ENTN) indicating a particular section in the specified still picture video object group, and said type information containing information indicative of any one of whether content contained in the reproduction path specified by the reproduction path information (UD_PGCI)
(a) contains moving pictures and no still pictures,
(b) contains still pictures and no moving pictures, and
(c) contains a mixture of moving pictures and still pictures.

5. A reproducing device for reproducing an optical disc having an area for recording a video object including at least one of a moving picture video object (M_VOB) and a still picture video object (S_VOB), and a management information recording area for storing management information, the reproducing device comprising:

an arrangement which reproduces reproduction path information from the management information recording area;

an arrangement which extracts from said reproduction path information, at least one of first information and second information; and an arrangement which reproduces from the management information, type information (PL_TY) indicating a type of a reproduction path corresponding (PGCN) to said reproduction path information;

said first information containing information (M_VOBI_SRPN) specifying a moving picture video object, cell video starting time information (C_V_S_PTM), and cell video ending time information (C_V_E_PTM) indicating a particular section in the specified moving picture video object, said second information containing information (S_VOGI_SRPN) specifying a still picture video object group containing at least one still picture video object, starting entry number information (S_S_VOB_ENTN), and ending entry number information (E_S_VOB_ENTN) indicating a particular section in the specified still picture video object group, and said type information containing information indicative of any one of whether content contained in the reproduction path specified by the reproduction path information (UD_PGCI)
(a) contains moving pictures and no still pictures,
(b) contains still pictures and no moving pictures, and
(c) contains a mixture of moving pictures and still pictures.

* * * * *

UNITED STATES PATENT AND TRADEMARK OFFICE
CERTIFICATE OF CORRECTION

PATENT NO.       : 6,285,826 B1
APPLICATION NO.  : 09/541883
DATED            : September 4, 2001
INVENTOR(S)      : Kaoru Murase et al.

It is certified that error appears in the above-identified patent and that said Letters Patent is hereby corrected as shown below:

Item (54) Title
Change "OPTICAL DISC RECORDING DEVICE AND REPRODUCING DEVICE" to --OPTICAL DISC, RECORDING DEVICE AND REPRODUCING DEVICE--.

Item (75) Inventors
Change "Katano" to --Katano-shi--;
Change "Takarazuka" to --Takarazuka-shi--.

Item (56) References Cited
U.S. PATENT DOCUMENTS
Change "Maruse et al." to --Murase et al.--.

FOREIGN PATENT DOCUMENTS
Change "12-4421" to --2000-4421--;
Change "12-83217" to --2000-83217--.

In the Drawings

Please replace Fig. 1 with amended Fig. 1 shown below.

--                                                              --

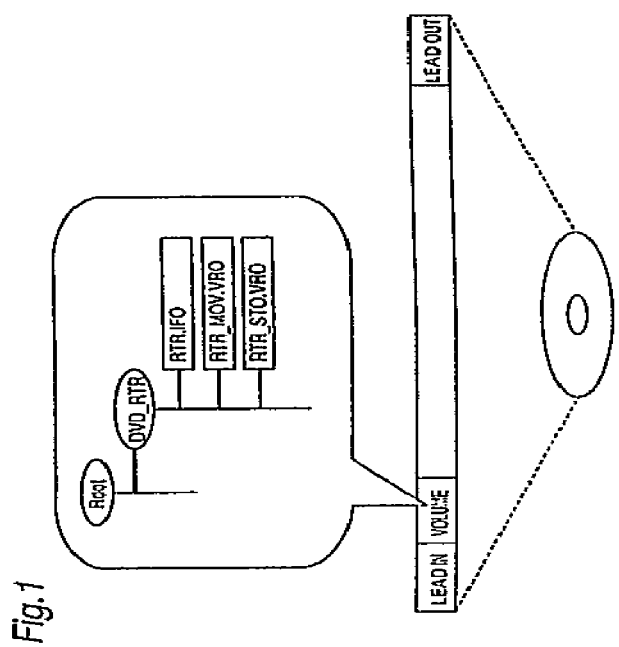

UNITED STATES PATENT AND TRADEMARK OFFICE
CERTIFICATE OF CORRECTION

PATENT NO. : 6,285,826 B1
APPLICATION NO. : 09/541883
DATED : September 4, 2001
INVENTOR(S) : Kaoru Murase et al.

It is certified that error appears in the above-identified patent and that said Letters Patent is hereby corrected as shown below:

In the Drawings (cont'd)

Please replace old Fig. 45 with amended Fig. 45 shown below.

-- 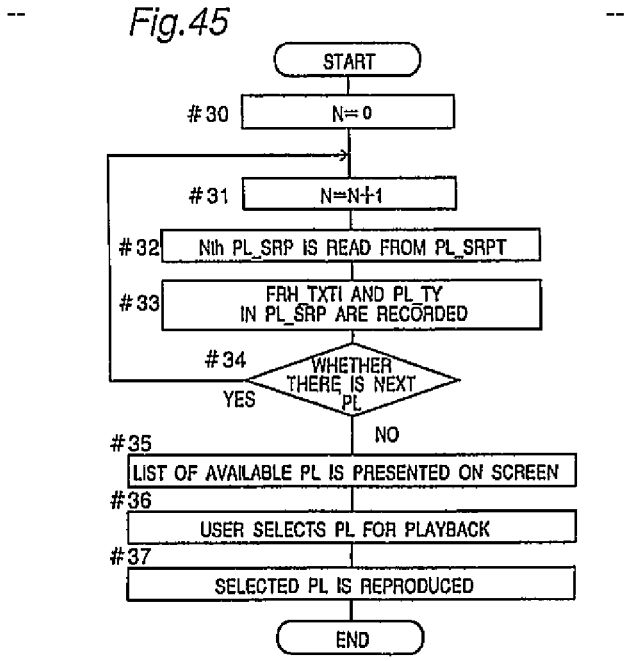 --

In the Specification
In the title,
    Change "OPTICAL DISC RECORDING DEVICE AND REPRODUCING DEVICE" to --OPTICAL DISC, RECORDING DEVICE AND REPRODUCING DEVICE--.

| | | |
|---|---|---|
| In Column 1, | line 18, | after "MPEG" insert --standards for encoding digital AV data--; |
| | line 19, | delete "standards for encoding digital AV data,"; |
| | line 27, | change "has" to --have--. |
| In Column 10, | line 16, | change "lay" to --play--. |

UNITED STATES PATENT AND TRADEMARK OFFICE
CERTIFICATE OF CORRECTION

PATENT NO. : 6,285,826 B1
APPLICATION NO. : 09/541883
DATED : September 4, 2001
INVENTOR(S) : Kaoru Murase et al.

It is certified that error appears in the above-identified patent and that said Letters Patent is hereby corrected as shown below:

In the Specification (cont'd)

In Column 14, line 2, change "0000 1000b;" to --0000 1000b:--;
line 22, change "43" to --13--;
line 35, delete "as shown in FIG. 44";
line 42, change "45" to --13--.

In Column 18, line 42, change "records" to --Records--.
line 66, change "S_VOB_SA" to --S_VOG_SA--.

In Column 24, line 30, delete "from" (first occurrence);

line 42, change "video" to --moving picture--;

line 44, change "#7" to --#6--.

In Column 25, line 30 change "the the" to --the--.

In Column 26, line 26, change "the "School Field Day"" to --an "Athletic Meet" --;

line 27, change "Overseas" to --Foreign--.

UNITED STATES PATENT AND TRADEMARK OFFICE
CERTIFICATE OF CORRECTION

PATENT NO. : 6,285,826 B1
APPLICATION NO. : 09/541883
DATED : September 4, 2001
INVENTOR(S) : Kaoru Murase et al.

It is certified that error appears in the above-identified patent and that said Letters Patent is hereby corrected as shown below:

In the Specification (cont'd)

In Column 27,   line 6,   change "C_V_S_PTM" (second occurrence) to --C_V_E_PTM--;

line 62,   change "doman" to --domain--.

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

PATENT NO.        : 6,285,826 B1
APPLICATION NO. : 09/541883
DATED             : September 4, 2001
INVENTOR(S)       : Kaoru Murase et al.

It is certified that error appears in the above-identified patent and that said Letters Patent is hereby corrected as shown below:

Item (54) Title
Change "OPTICAL DISC RECORDING DEVICE AND REPRODUCING DEVICE" to --OPTICAL DISC, RECORDING DEVICE AND REPRODUCING DEVICE--.

Item (75) Inventors
Change "Katano" to --Katano-shi--;
Change "Takarazuka" to --Takarazuka-shi--.

Item (56) References Cited
U.S. PATENT DOCUMENTS
Change "Maruse et al." to --Murase et al.--.

FOREIGN PATENT DOCUMENTS
Change "12-4421" to --2000-4421--;
Change "12-83217" to --2000-83217--.

In the Drawings
Please replace old "Fig. 1" with "insert new Fig. 1".

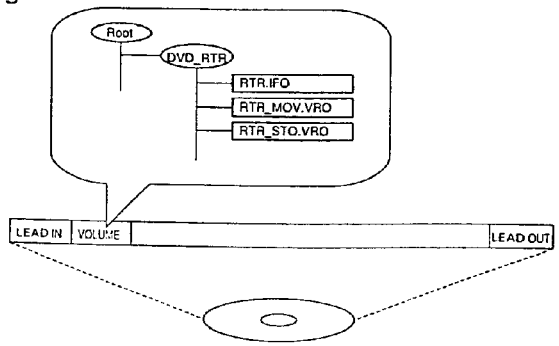

UNITED STATES PATENT AND TRADEMARK OFFICE
CERTIFICATE OF CORRECTION

PATENT NO.        : 6,285,826 B1
APPLICATION NO.   : 09/541883
DATED             : September 4, 2001
INVENTOR(S)       : Kaoru Murase et al.

It is certified that error appears in the above-identified patent and that said Letters Patent is hereby corrected as shown below:

Please replace old "Fig. 45" with please insert --amended Fig. 45--.

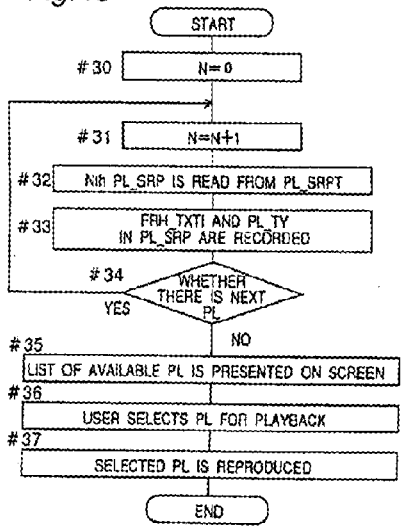

In the Specification
In the title,
   Change "OPTICAL DISC RECORDING DEVICE AND REPRODUCING DEVICE" to --OPTICAL DISC, RECORDING DEVICE AND REPRODUCING DEVICE--.

UNITED STATES PATENT AND TRADEMARK OFFICE
CERTIFICATE OF CORRECTION

PATENT NO.      : 6,285,826 B1
APPLICATION NO. : 09/541883
DATED           : September 4, 2001
INVENTOR(S)     : Kaoru Murase et al.

It is certified that error appears in the above-identified patent and that said Letters Patent is hereby corrected as shown below:

| | | |
|---|---|---|
| In Column 1, | line 18, | after "MPEG" insert --standards for encoding digital AV data--; |
| | line 19, | delete "standards for encoding digital AV data,"; |
| | line 27, | change "has" to --have--. |
| In Column 10, | line 16, | change "lay" to --play--. |
| In Column 14, | line 2, | change "0000 1000b;" to --0000 1000b:--; |
| | line 22, | change "43" to --13--; |
| | line 35, | delete "as shown in FIG. 44"; |
| | line 42, | change "45" to --13--. |
| In Column 18, | line 42, | change "records" to --Records--. |
| | line 66, | change "S_VOB_SA" to --S_VOG_SA--. |
| In Column 24, | line 30, | delete "from" (first occurrence); |
| | line 42, | change "video" to --moving picture--; |
| | line 44, | change "#7" to --#6--. |
| In Column 25, | line 30 | change "the the" to --the--. |

UNITED STATES PATENT AND TRADEMARK OFFICE
CERTIFICATE OF CORRECTION

PATENT NO. : 6,285,826 B1
APPLICATION NO. : 09/541883
DATED : September 4, 2001
INVENTOR(S) : Kaoru Murase et al.

It is certified that error appears in the above-identified patent and that said Letters Patent is hereby corrected as shown below:

In Column 26, line 26, change "the "School Field Day"" to --an "Athletic Meet"--;
line 27, change "Overseas" to --Foreign--.

In Column 27, line 6, change "C_V_S_PTM" (second occurrence) to --C_V_E_PTM--;
line 62, change "doman" to --domain--.

Signed and Sealed this

Twenty-fifth Day of March, 2008

JON W. DUDAS
*Director of the United States Patent and Trademark Office*